United States Patent [19]

Brown

[11] Patent Number: 4,853,878

[45] Date of Patent: Aug. 1, 1989

[54] COMPUTER INPUT BY COLOR CODING

[75] Inventor: Max R. Brown, Pleasanton, Calif.

[73] Assignee: International Business Machines Corp., Armonk, N.Y.

[21] Appl. No.: 45,054

[22] Filed: May 1, 1987

[51] Int. Cl.[4] .............................................. G06F 3/023
[52] U.S. Cl. .................................... 364/521; 340/712; 341/28
[58] Field of Search ................. 364/521, 518; 340/712, 340/365 R, 365 VL

[56] References Cited

U.S. PATENT DOCUMENTS 4,549,279 10/1985 Lapeyre ............................ 364/709
4,555,193 11/1985 Stone ................................. 400/486

OTHER PUBLICATIONS

A. G. Leonard et al., "Arrangement to Clarify Text Processing Functions Using Color", *IBM Technical Disclosure Bulletin*, vol. 27, No. 9, Feb. 1985, p. 5410.

Primary Examiner—Gary V. Harkcom
Assistant Examiner—Randy W. Lacasse
Attorney, Agent, or Firm—C. Lamont Whitham; Michael E. Whitham

[57] ABSTRACT

A display technique allows the user to input information to a computer in the form of color with character text. The technique provides an ergonomic approach to convey information to an application program by using color to specify functions or attributes. Colors are used to reduce the number of interactions necessary to accomplish a task between the user and the application program. In many systems a command has to be typed to save a file. These commands range in size from one to many characters and require the user to key in each character and the filename. The improvement described is a technique for typing the filename in a specified color that the application interprets to mean, for example, Save the file. The technique assigns a color to data elements input to the system. The color is interpreted by the application to indicate what specific function, attribute or value should be associated with the data element. For example, if the user enters a file name with a brown background, the application interprets this to mean that the file is to be edited, and should be retrieved for editing if it exists on disk. Thus, by associating a color with the data element, the specific function to be performed has been relayed without the overhead of additional keystrokes or character information.

10 Claims, 34 Drawing Sheets

FIG. 1A

INDEX TO PROGRAM STATEMENT  130
LABELS IN FLOWCHARTS

| PROGRAM STATEMENT LABEL | | FLOWCHART FIGURE LOCATION |
|---|---|---|
| 800 | – | 1 |
| 830 | – | 1 |
| 890 | – | 3 |
| 895 | – | 5 |
| 900 | – | 10 |
| 915 | – | 7 |
| 919 | – | 8 |
| 932 | – | 9 |
| 935 | – | 9 |
| 940 | – | 6 |
| 970 | – | 30 |
| 995 | – | 30 |
| 1080 | – | 15 |
| 1084 | – | 16 |
| 1025 | – | 27 |
| 1035 | – | 27 |
| 1040 | – | 28 |
| 1050 | – | 27 |
| 1072 | – | 28 |
| 1115 | – | 21 |
| 1140 | – | 18 |
| 1200 | – | 11 |
| 1230 | – | 12 |
| 1270 | – | 13 |
| 1290 | – | 14 |
| 1330  110 | – | 2 |
| 1470 | – | 29 |
| 1520 | – | 4 |
| 1610 | – | 20 |
| 1705 | – | 21 |
| 1740 | – | 20 |
| 1745 | – | 21 |
| 1770 | – | 18 |
| 1850 | – | 19 |
| 1920 | – | 19 |
| 1930 | – | 19 |
| 2050 | – | 17 |
| 2100 | – | 22 |
| 2115 | – | 22 |
| 2125 | – | 22 |
| 2170 | – | 22 |
| 2200 | – | 23 |
| 2270 | – | 25 |
| 2300 | – | 24 |
| 2400 | – | 26 |
| 2600 | – | 23 |
| 3790 | – | 19 |

FIG. 31 SAMPLE TEXT BEFORE (ABOVE) AND AFTER (BELOW) MULTIPLE EDITING OPERATIONS, INCLUDING MOVE, COPY, AND DELETE

      

```
 1  THIS PROGRAM DEMONSTRATES THE USE OF COLOR, IN CONJUNCTION
 2  WITH TEXT INPUT, AS A MEANS OF CONVEYING INFORMATION TO A
 3  COMPUTER PROGRAM.  THIS PERMITS THE INPUT OF MORE INFOR-
 4  MATION WITHIN A GIVEN DATA FIELD THAN IS POSSIBLE WITH TEXT
 5  ALONE.  SOME EXAMPLES OF THE TYPES OF DATA WHICH CAN BE
 6  INPUT BY COLOR IN A TEXT FIELD ARE AS FOLLOWS:
 7
 8  1. THE COLOR MAY SPECIFY A FUNCTION TO BE PERFORMED
 9     ON THE DATA ELEMENT.
10  2. IT MAY DEFINE AN ATTRIBUTE TO BE ASSOCIATED WITH THE
11     DATA ELEMENT.
12  3. IT MAY DEFINE A VALUE TO BE ASSIGNED TO THE DATA ELEMENT.
```

      

```
 1  THIS PROGRAM DEMONSTRATES THE USE OF COLOR, IN CONJUNCTION
 2  WITH TEXT INPUT, AS A MEANS OF CONVEYING INFORMATION TO A
 3  COMPUTER PROGRAM.  THIS PERMITS THE INPUT OF MORE INFOR-
 4  MATION WITHIN A GIVEN DATA FIELD THAN IS POSSIBLE WITH TEXT
 5  ALONE.  SOME EXAMPLES OF THE TYPES OF DATA WHICH CAN BE
 6  INPUT BY COLOR IN A TEXT FIELD ARE AS FOLLOWS:
 7
 8  1. THE COLOR MAY SPECIFY A FUNCTION TO BE PERFORMED
 9     ON THE DATA ELEMENT.
10  2. THE COLOR MAY DEFINE AN ATTRIBUTE TO BE ASSOCIATED WITH
11     OR A VALUE TO BE ASSIGNED TO THE DATA ELEMENT.
```

COMPUTER INPUT BY COLOR CODING

BACKGROUND OF THE INVENTION

Field of the Invention

This invention generally relates to computer display systems, and more particularly to color display systems with the ability to associate information being displayed with the colors used to display it. The invention is a method which allows a user of a computer program to specify information, such as operations or data characteristics and values, by means of a selected color entered into a text data field.

Description of the Prior Art

Computer display systems have used color for highlighting information on a display screen. Some systems have given the user the capability of switching between combinations of color for background and foreground entries. A good example of this approach is found in some word processors. These systems provide an initial profile display that provides two boxes that display the background color and the foreground color. The user presses a function key to interactively change the foreground color selections until a desired color appears. Then the user can use another function key to select a background color in a similar way. Using this procedure, the user can select the colors that best meet their personal tastes.

Display color coding has also been used in display systems by using an internal header to a data stream specifying such information as what color to set the background. The data stream is interpreted by the color display signal processor, and the background color is displayed as specified. A disclosure of this technique is found in U.S. Pat. No. 4,384,284, to Juso et al., issued Mar. 6, 1980.

Another usage of color in conjunction with display technology is found in U.S. Pat. No. 4,233,601, to Hankins et al., issued Nov. 11, 1980. This invention pertains to compressing the data stream being sent to a raster display by indicating transitions from one color to another by a color key. This technique uses codes to designate conditions where colors change and codes to indicate how far a color should span on the display. Employing this technique, significant savings in the amount of data stored to represent an image on a raster display can be realized.

Another approach employing color to communicate information to a user is disclosed in Lippman et al., "Color Word Processing", *IEEE Computer Graphics and Architecture*, June 1985, pp. 41 to 46. The word processor disclosed in the Lippman et al. article uses various colors to indicate deletions that were made while a document was created. Each time the document was saved, the revisions for that session were saved with the color attribute associated with the revisions. Then if the user wanted to undo or back out of a revision, this could be accomplished using a function key selection and positioning the cursor on the color of the revision level that was desired.

All of the techniques discussed so far have one thing in common. They are all output techniques for conveying information to a user.

SUMMARY OF THE INVENTION

It is therefore an object of the present invention to allow the user to input information to the computer by the addition of color characteristics to text.

It is a further object of the invention to reduce the amount of space that is necessary to convey information to an application program by using color to represent a function or data.

It is another object of this invention to use color to reduce the number of interactions necessary to accomplish a task between the user and the application.

According to the invention, these objects are accomplished by assigning a color to desired data elements input to the system. The color is interpreted by the application to indicate what specific function, attribute or value should be associated with the data element. For example, if the user enters a file name with a brown background, the application interprets this to mean that it is to edit the file with the associated name, and to retrieve it for usage if it exists on disk. Thus, by associating a color with the data element, the specific function to be performed has been relayed without the burden of additional keyboard entry.

BRIEF DESCRIPTION OF THE DRAWINGS

The foregoing and other objects, aspects and advantages of the invention will be better understood from the following detailed description of a preferred embodiment with reference to the drawings, in which:

FIG. 1a is an index correlating program statement branch labels with flowchart figure location;

FIG. 31 is an illustration of sample text before and after multiple editing operations, including move, copy, and delete.

DETAILED DESCRIPTION OF THE PREFERRED EMBODIMENT OF THE INVENTION

Figure 1:
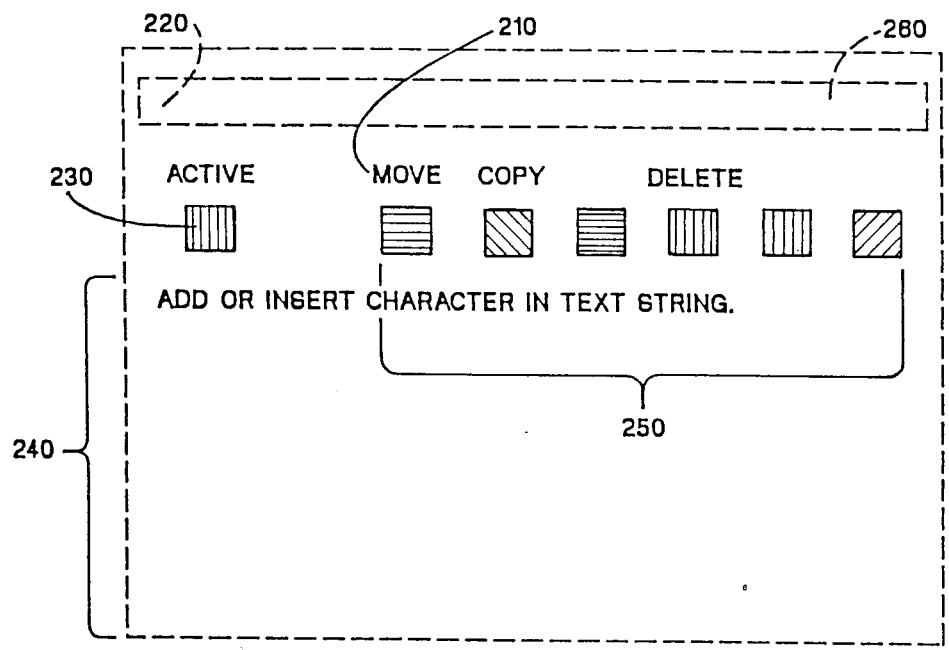
FIG. 1 is a diagram of the screen layout of the preferred embodiment.

While the display system disclosed in this application is described in a preferred embodiment, those skilled in the art will recognize that the invention may be readily applied to other applications. The preferred embodiment is a text editor using the color input coding scheme. More specifically, the invention provides ergonomic improvements to common text editing functions. The functions include creating, retrieving, modifying and saving files. Referring now to the drawings, and more particularly to FIG. 1, a sample display screen is presented with the major fields labeled. The area indicated by 220 shows the file name entry field. This is where the name of the file to be created, modified, or deleted is entered. Label 260 identifies a field in which the program occasionally displays warning or status messages to the user. Label 230 points to an area which shows the current active color. This is the color which the editor will use at the present time to define or perform an editing operation, when requested by the user. Label 250 identifies a set of blocks of different colors, in the same line as the active color area (referred to in this description as a Color Control Line, or just the Color Line). Each color shown here represents an operation which may be defined and performed through the use of this color by the editor. The colors and their various functions will be described below. The user can select any of these operations by color.

The line indicated by label 210, just above the color line, is used to show labels identifying the operations associated with the blocks of color, when the user requests help by pressing Function key F1. Each label is shown immediately above the color associated with its operation. The labels shown will differ depending upon whether the cursor is in the file name area or the text area, reflecting the different operations in these areas. If the cursor is in the file name area (the heading line), the labels shown identify operations associated with files. If the cursor is in the text area, the labels shown identify editing operations.

The text area is indicated by label 240. This is the area most often used, for entering text and performing editing operations.

A background color in the file name field is used to control operations upon a file as a whole; for example, obtaining a file to be edited, storing one after editing, or renaming one. The presence of a background color in this field when a file name is typed in, or the addition of one to the field when a file name is already present, will activate the associated function. The operations available for files, and the colors which represent the operations, in this preferred embodiment are:

Brown—Retrieve the file specified in the file name field.

Cyan—Store on disk or diskette the file currently in memory. The file specification in the file name field is used.

Magenta—Rename and store on disk or diskette the file in memory. The user must also provide the new name for the file.

Red—Cease all operations on a file being edited, or exit the program if no file is being manipulated.

Blue—This function clears existing operations, and waits for new input.

Three text editing functions specified by color inputs may be performed by this program. In the normal mode of operation, execution of one of these functions in this embodiment is carried out in two stages; definition of the editing function, and actual performance of the operation. The second stage, execution, is not done until the user specifically requests it (by pressing Function key F10 in this preferred embodiment). Therefore multiple editing operations may be defined together, and may be executed at the same time. The set of control keys used to define and execute these functions is the same for all of the operations; only the colors used tell the editor which functions to perform on text.

One editing function, Delete, may also be executed in an immediate mode. In this case, the amount of material deleted is determined by the active operation color (the one displayed in the leftmost box of the Color Line). The cursor is placed at the character or within the word or line to be deleted, and the Delete key is pressed to perform the operation. The quantities of text which can be deleted in one operation, and the colors which specify them when shown as the active operation color, are as follows:

Red—only the character at the cursor position will be deleted.

Magenta—the word which includes the cursor position is deleted.

Brown—the entire line which includes the cursor location is deleted.

The editing functions available in the normal mode of operation as described above, and the colors which activate them in this preferred embodiment, are:

Red—Causes a Delete of the text marked in this color.

Green—Causes a Copy of the text marked in this color to an indicated location.

Blue—Causes a Move of the text marked in this color to an indicated location.

For the Move and Copy operations a target location for the text must also be defined, and related to the specific text being transferred. This is also done with color in this editor. A color of the user's choice, referred to in this document as a marker color, is used to mark the point in the text at which the moved or copied material is to be placed, and to mark the text being manipulated, associating it with the destination location.

At the destination location, an arrowhead which will display in color is substituted for blank characters which will not display, for the benefit of the user. Also, the user may wish the material being moved or copied to be placed beginning with the character position being marked (i.e., immediately following the preceding character), or beginning with the character position immediately following that marked. Therefore, either side of the marker position may be significant. Two input codes are used in this preferred embodiment to provide this choice.

The source text for one of these operations therefore requires two colors to be specified, and displayed within its area; the color representing the operation to be performed, and the color identifying its final position.

The text editor being described here operates in two input modes:

1. Normal input of text to be added to file being created or modified. This text is displayed in a color which has no special significance to the editor (does not represent any operation to be performed).

2. Input of color to define an operation to be performed on text or (in the heading line) files. Color may be added to already existing text, or input together with text.

The second of the above input modes is referred to in this document as the Color Mode. When the Color Mode is on, the editor is adding some user-selected color to the material being edited. The Color Mode is off for normal text input. Although it is referred to as a Color Mode, since color is the significant element being input in this case, this mode is in fact an Operation Definition mode, as the color is being used for this purpose. It is only used to define operations. Execution, as noted earlier, is a separate function in the normal operation of this editor.

The color mode is turned on and off by a single key (Function key three in this preferred embodiment), which simply changes the on/off condition to the alternative choice each time it is pressed.

Internally, the program sets up one or more operation definition blocks (referred to in this document simply as operation blocks) for each editing operation the user specifies, as the function is defined. These blocks are used to save information about the function to be performed, from the time it is defined until it is executed. One block is set up for the operation itself, and an additional block is prepared for any destination marker which may be specified for the function. Each block is associated with the line of text in which the operation or marker is located, and contains the following information about the operation or marker:

1. A code representing:
   a. For an operation, the operation color (in the preferred embodiment, the code sent to or read from the IBM Color Graphics Adapter and Display)
   b. For a marker, a code designating the block as representing a marker, and indicating which side of the marker character is to be used 2. A code representing the marker color, when required (the code is the same form as in the preceding entry)

3. The position in the line and the length of the text material to be operated upon. For a marker, the length is zero.

In this implementation, empty operation blocks are predefined and allocated in an array at the time the program is initialized for execution.

A function is also available to cancel a text editing operation at any time during the definition stage, if the user has a change of mind. Execution of this function does two things:

1. It rewrites in the normal (non-operational) color any text that has been displayed in either an operation color or a marker color for the operation being revoked.

2. It marks as empty, or unused, the operation block which the editor has set up for the operation or marker being revoked.

The cancellation function is performed in this implementation by positioning the cursor at the start of the material which has been marked in color for the operation to be canceled, and pressing Alternate-function key three. A destination marker for a Move or Copy operation will not be eliminated automatically when the operation itself is canceled; a second cancellation function will have to be performed on the marker.

The color shown in the Active Color block (the leftmost block in the Color Line) is, as noted earlier, the one which is used at any time that the editor is told to include color in some edit or file function specification; adding color to text to be edited, or setting a background color in the file name field.

The active color is changed to select different functions and different marking colors for editing operations. In this preferred embodiment the active color is altered by selecting the next color in a list of possible hues. Function keys F5 and F6 are used to step the color selection through the list entries; successive presses of F5 move through the list of colors in one direction, while pressing F6 moves the selection through the list in the opposite direction. In both cases, when an end of the list is reached, the next press of the same key returns the selection to the opposite end of the list, and further presses repeat the list.

The selection of an active color can be done in two ways:

1. If the cursor is in the Color Line (in one of the six rightmost color boxes), the F5 and F6 keys will step the cursor from one color block to the next each time they are pressed. The list of colors available in this case includes only the six shown in these color blocks. When the cursor is in the desired color, pressing Function key F3 will change the active color to the one chosen. When the cursor is located in the heading line, it may be moved to the Color Line by pressing Function key F2, and returned to the heading line after color selection by pressing F2 a second time. When the cursor is located in the text area, it may be moved to the Color Line by pressing Function key F4, and returned to its previous location in the text area by pressing F4 a second time.

2. If the cursor is in the heading line or the text area, each press of Function key F5 or F6 causes the editor to immediately replace the current active color with the next color in the list of those available. In this case the number of possible colors is fourteen, including the six available in (1) above.

It was noted earlier that a standard set of control keys is used in all of the operations in this editor. The following is a listing of all of the keys used here, together with brief summaries of their uses.

Function key 1—Provides a Help function, which is very limited in this preferred embodiment. A one-word (sometimes truncated) identification of the function associated with each color shown in the color line is displayed when this key is pressed. These words are presented just above the blocks for their respective colors in the color line. Pressing F1 a second time will erase these words. The function associated with each color differs between the Heading Line and the Text area. The appropriate word is shown, based upon the area in which the cursor is located, whenever the key is pressed.

Function key 2—Positions the cursor in the heading line, or, if it is already there, in the color line. This key is used primarily to move the cursor from the text area (saving its location there) to the heading line.

Function key 3—Turns the color mode (operation definition mode) on and off. This function was described earlier.

Function key 4—Positions the cursor in the text area, or, if it is already there, in the color line. Used primarily to move the cursor from the heading line to the text area, and to a previous location there if one was saved (see Function key 2 above).

Function key 5—Steps the active color selection through the possible range of colors. The use of this key in color selection was discussed in detail earlier.

Function key 6—Steps the active color selection through the possible range of colors. The use of this key in color selection was discussed in detail earlier.

Function key 10—Pressing this key causes the editor to execute all operations which have been defined with color inputs, and are waiting to be performed.

Carriage Return—Conventional operation; reposition the cursor to the start of the next line down.

Cursor Up, Down, Right, and Left keys—Conventional operation; move the cursor one position at a time in the direction appropriate to the key.

Tab Right and Left keys—Both cause a mark to be defined and displayed which will be used as a destination point for a Move or Copy operation. The Tab Right key generates a marker whose significant side (the position at which inserted text will begin) is to the right. The Tab Left key generates a marker whose significant side (the position at which inserted text will begin) is to the left. The side significance of a marker was discussed earlier.

Delete—Conventional function; deletes text from a line. Unique specification of the quantity of text to delete; uses color. This function was described earlier.

Backspace—Conventional operation; move the cursor one position to the left, and delete the character at the new position from the file line and the display.

Alternate-F3 key—Cancels a text editing operation being specified with color inputs during the definition stage. This function was described earlier.

In FIG. 1a an index is given to program statement branch labels in the flowcharts. This index provides a handy guide through the flowcharts, permitting easy location of branch label positions.

Figure 1B:
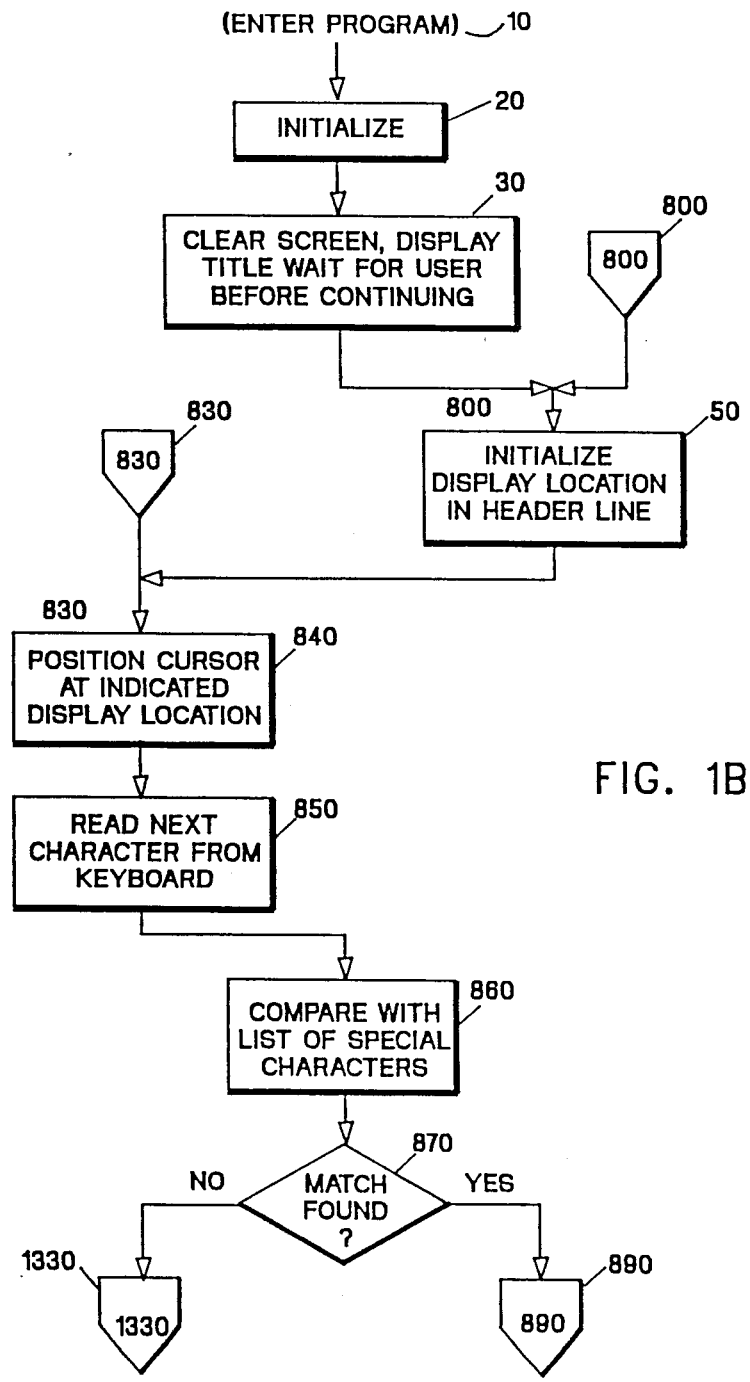
FIG. 1b is a flowchart depicting the initialization and the keyboard input processes of the preferred embodiment of the invention.

In FIG. 1b, at branch label 10 the program is entered by keying a system command to load the program or by selecting the program from a menu. Then the initialization process of the word processing application is invoked in function block 20. Following initialization, the logo screen is displayed until the user presses the enter key in function block 30.

Whenever the system returns to the primary display, a branch will be made to branch label 800. Here the application is initialized to display the cursor at the start of the heading line. Following this, another branch label, 830, is used as a common return point following most of the editor's responses to individual keys or key combinations as they are pressed. The application positions the cursor according to a program specified location in function block 840. The application polls the keyboard for data entry and, at function block 850, the next character entered is read. Each character read is compared to a list of special characters in function block 860 and a test for a match is made in decision block 870. Special characters are those characters which cause special functions, such as cursor movement or color change, to be performed by the program. Some of these characters are shown in FIG. 3. If the character is not a special one, then control is passed to branch label 1330 shown in FIG. 2; otherwise, if a special character is entered, control is passed to 890 shown in FIG. 3.

Figure 2:
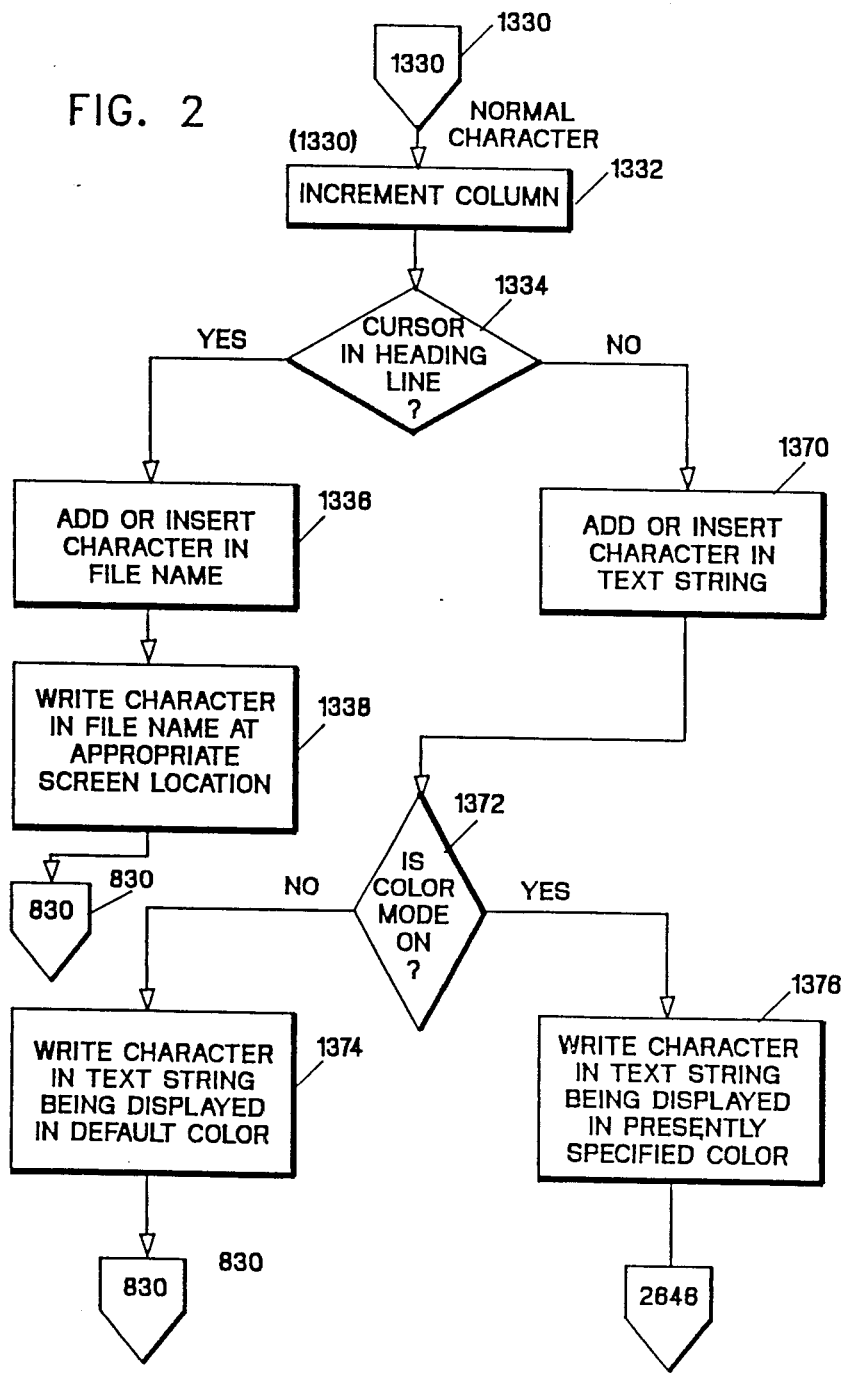
FIGS. 2 and 2a are flowcharts depicting the basic disposition of an input character which has no control function.
Figure 3:
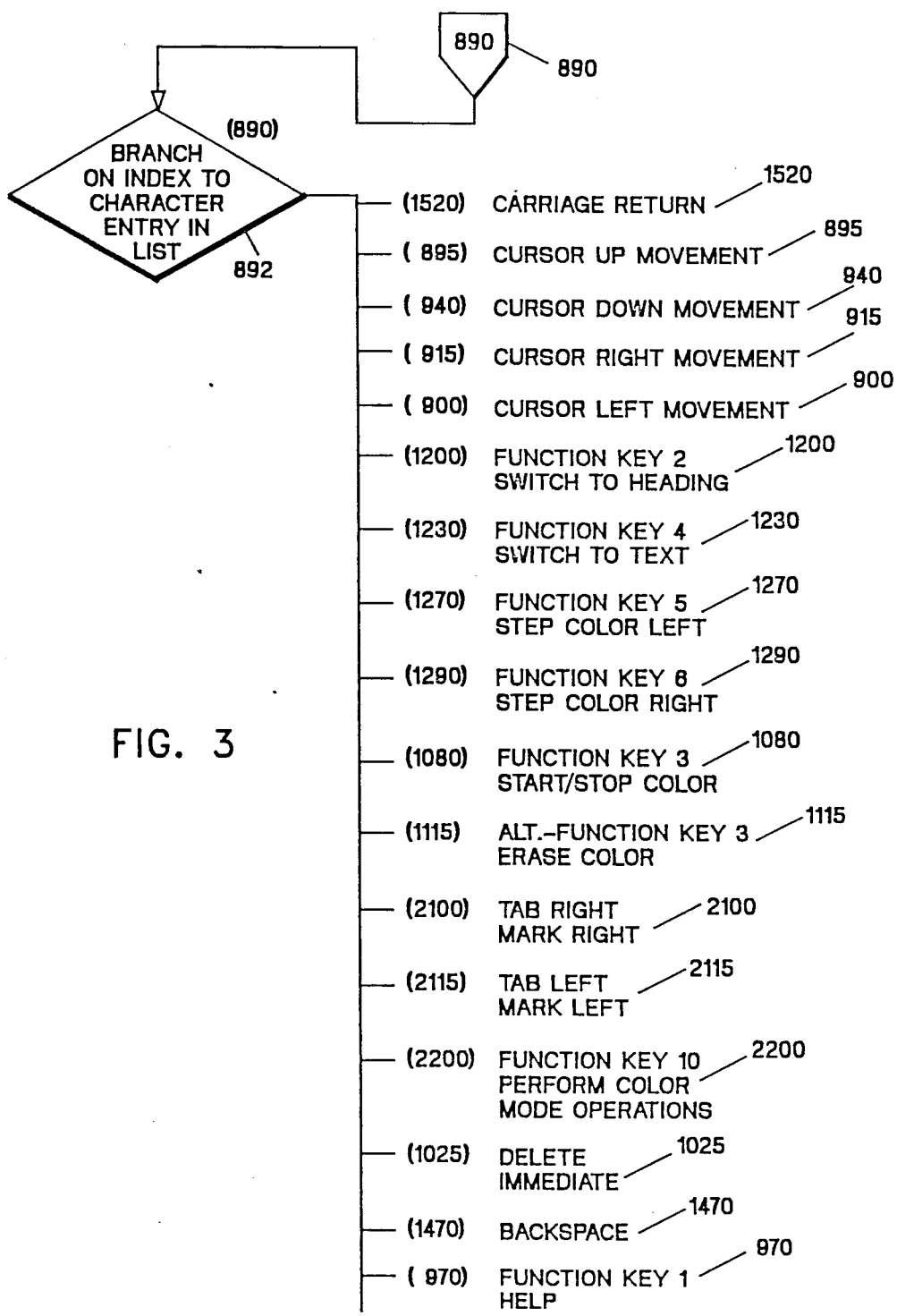
FIG. 3 is a flowchart showing the mapping of the program functions to the keys for carrying out the functions.

In FIG. 2 the basic disposition of an input character which has no control function is shown. Control enters at branch label 1330 and enters function block 1332 where the column pointer is incremented to position the cursor at the next entry location. The application determines whether the cursor is positioned in the heading line area in decision block 1334. If the cursor is in the heading line, a character is added to the file name in the heading line in function block 1336, and the file name is redisplayed in the file name field of the heading line in function block 1338. Application flow proceeds from there to branch entry 830.

If the cursor is not found to be in the heading line in decision block 1334, it is assumed to be in the text area, and the character is inserted into the text string currently being modified or added to a text string being built, as indicated in function block 1370.

Then in decision block 1372 a test is made to determine if the color mode is on (i.e., an editing operation is being defined by color input). Whether the mode is on or not, the character being input will be shown on the display at the position indicated by the current cursor location. If the color mode is not on, the character is displayed in the default (normal, or non-operation) color, as indicated in function block 1374. Then, control returns to branch entry 830 in FIG. 1b, as indicated at branch label 830.

If the color mode is on, the character being input will be displayed in the color presently specified for the operation being defined. This may be either the operation color or a marker color.

Figure 2A:
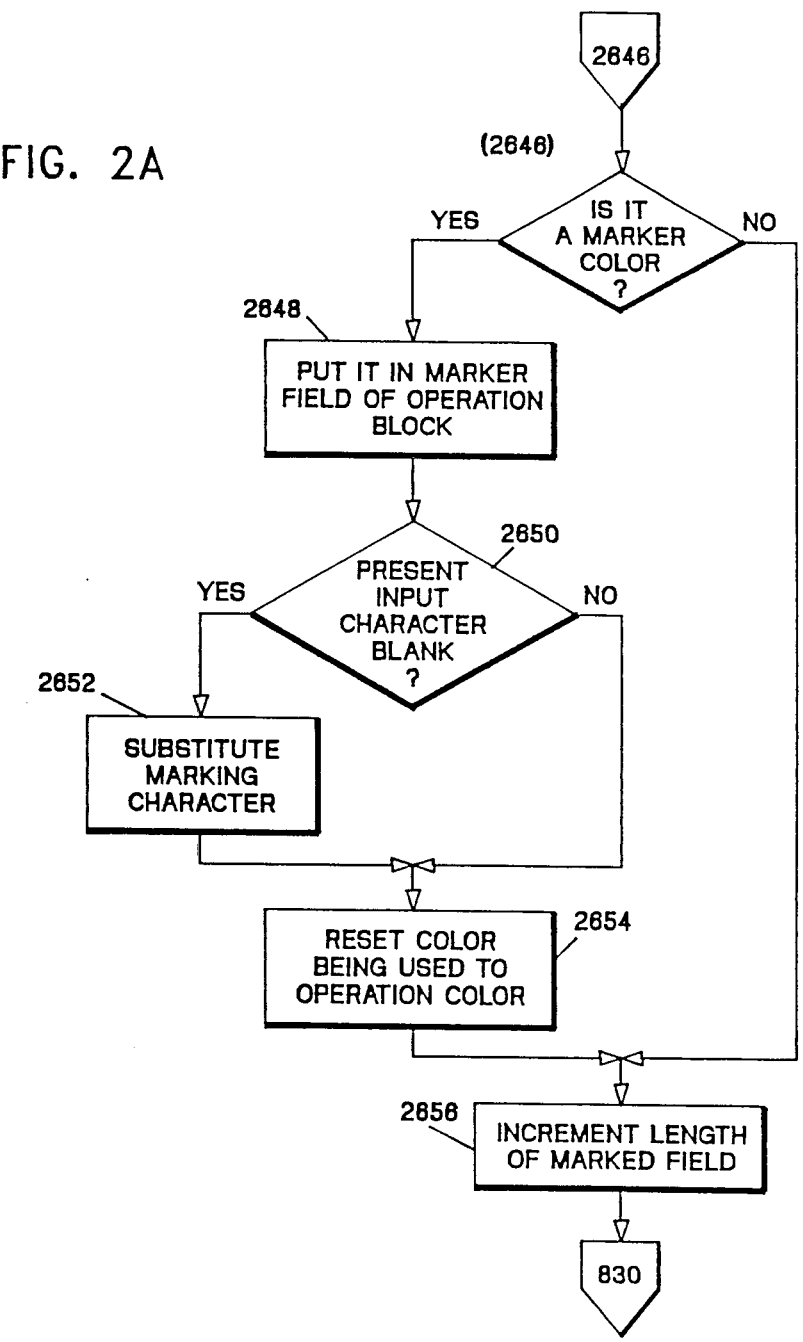

Following the character display, a test is performed at decision block 2646 in FIG. 2a to determine if the color just displayed is a marker color. If it is not, control is passed to function block 2656. If the color is a marker color, a code identifying the color is stored in the marker field of the operation block maintained by the program for the function being defined, as shown in function block 2648.

Next, a test is performed in decision block 2650 to determine if the character being input is a blank. If so, then a special marking character which can be shown in color is substituted for the blank in the display, in function block 2652. If the input character is not a blank, no special action is taken here. In either case, control transfers to function block 2654, where the current active color (as shown in the leftmost box of the Color Line) is reset to the operation color. Control then passes to function block 2656, where the length of the text being designated for the operation (kept in the operation block) is incremented for the character just marked. Control is then transferred back to branch entry 830 in FIG. 1b.

FIG. 3 shows the function flow of the selection of program functions for control key inputs. Control enters at branch label 890 and immediately enters decision block 892. The outcome of decision block 892 is a case statement determination based on an index that indicates the branch label to which control passes. The index represents the position of the control key input being processed in a table of control codes acceptable to the editor. For example, if the carriage return key is pressed, control is passed to branch label 1520 to handle a carriage return. If the cursor up key is pressed, control is passed to 895 to handle cursor up movement. If the cursor down key is pressed, control is passed to 940 to handle cursor down movement. If the cursor right key is pressed, control is passed to 915 to handle cursor right movement. If the cursor left key is pressed, control is passed to branch label 900 to handle cursor left movement. If function key two is pressed, control is passed to branch label 1200 to handle switching to the heading line, if the user is not there already, or the color line if the user is in the heading line. If function key four is pressed, control is passed to branch label 1230 to switch to the previous location in the text area when not in text, and to the color line when the present location is in the text area. A similar transfer of control occurs for the remaining branches in FIG. 3.

Figure 4:
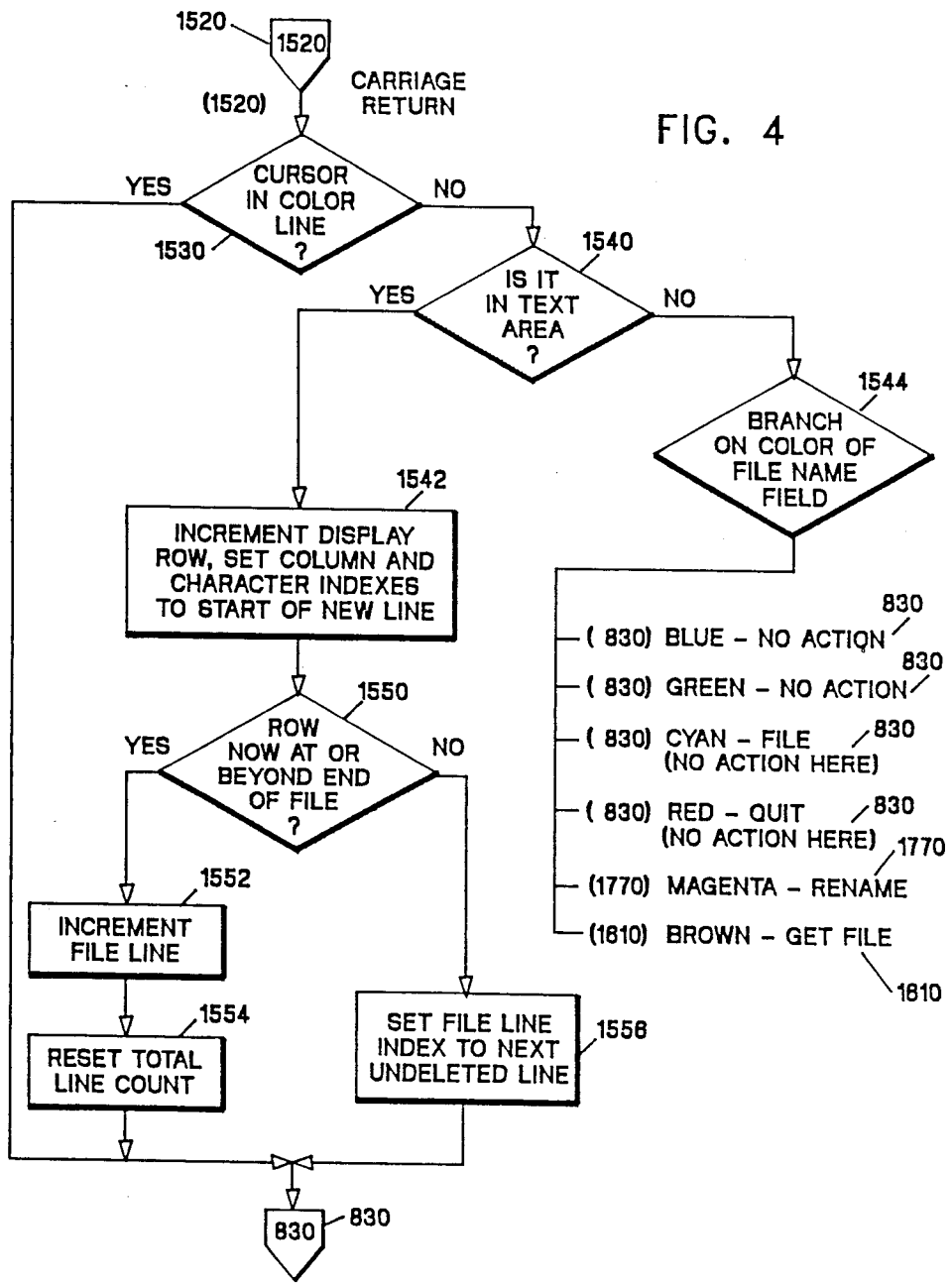
FIG. 4 is a flowchart showing the enter/carriage return key application logic.

FIG. 4 is a flowchart showing the carriage return key application logic. Control enters at branch label 1520 and immediately enters decision block 1530 where a determination of whether or not the cursor is in the color line is made. If the cursor is in the color line, then control is passed to branch entry 830 in FIG. 1b. If the cursor is not in the color line, then control flows into the decision block 1540, where a determination is made as to whether the cursor is in the text area. If the cursor is in the text area, then the display row is incremented, the column index is set to the first position and the character index is set to the start of a new line in function block 1542. These steps allow the application to position the cursor to the first position of the next line in an upcoming instruction sequence.

In decision block 1550, a test is made to determine if the row has reached the end of file. If it has, then the file line is incremented at function block 1552, the total line count is reset to the updated line count at function block 1554, and control is passed to branch entry 830.

If the cursor is not in the text area in decision block 1540, then it is in the heading line. A case statement decides which file function, specified by color, to execute in decision block 1544. If the color of the filename is blue, green, cyan, or red control is passed to branch label 830 to continue execution of the application with, no action taken. If the color of the filename area is magenta, control is passed to branch label 1770 to test for possible execution of the Rename file function. If the color of the filename area is brown, control is passed to branch label 1610 to test for the possible execution of the Get file function.

Figure 5:
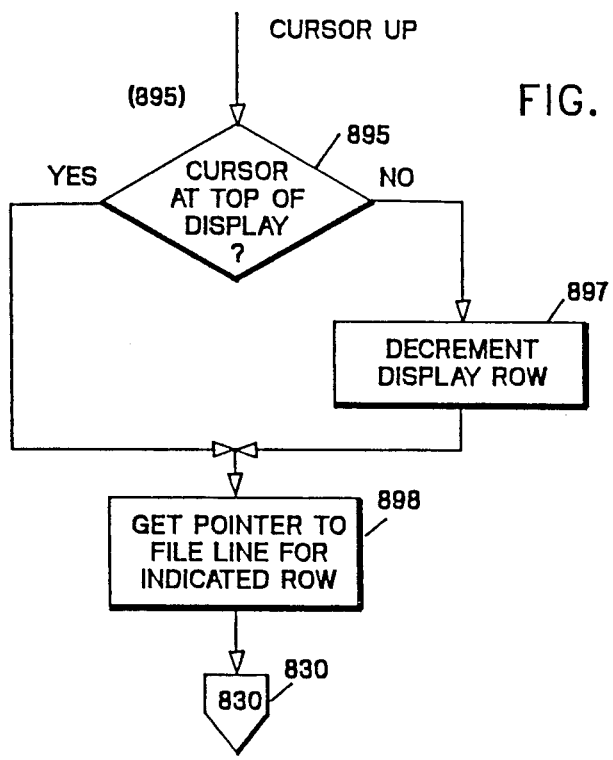
FIG. 5 is a flowchart showing the application logic associated with the key to move the cursor up.

FIG. 5 shows the application logic associated with the cursor up key. Control enters, from FIG. 3, at the decision block labeled 895, where the cursor is tested for being at the top of the display. If the cursor is not at the top of the display, then the display row is decremented in function block 897; otherwise, no action is taken here. Next, the pointer to the file line for the row indicated is obtained in function block 898, and control is passed to branch label 830, in FIG. 1b, for positioning the cursor and getting the next character entered.

Figure 6:
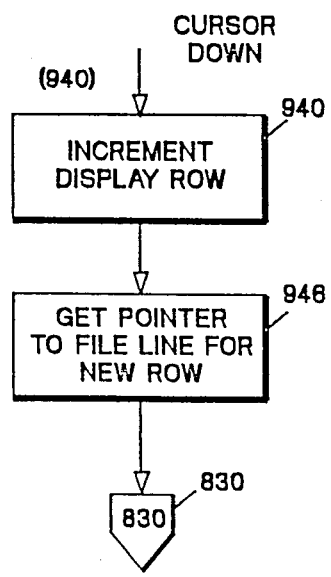
FIG. 6 is a flowchart showing the application logic associated with the key to move the cursor down.

FIG. 6 shows the application logic associated with the cursor down key. Control enters at function block 940 from FIG. 3 where the display row is incremented. Then the pointer for the file line for the new row is obtained in function block 946, and control is passed to branch label 830 which loops back to FIG. 1b for positioning the cursor and getting the next character entered.

Figure 7:
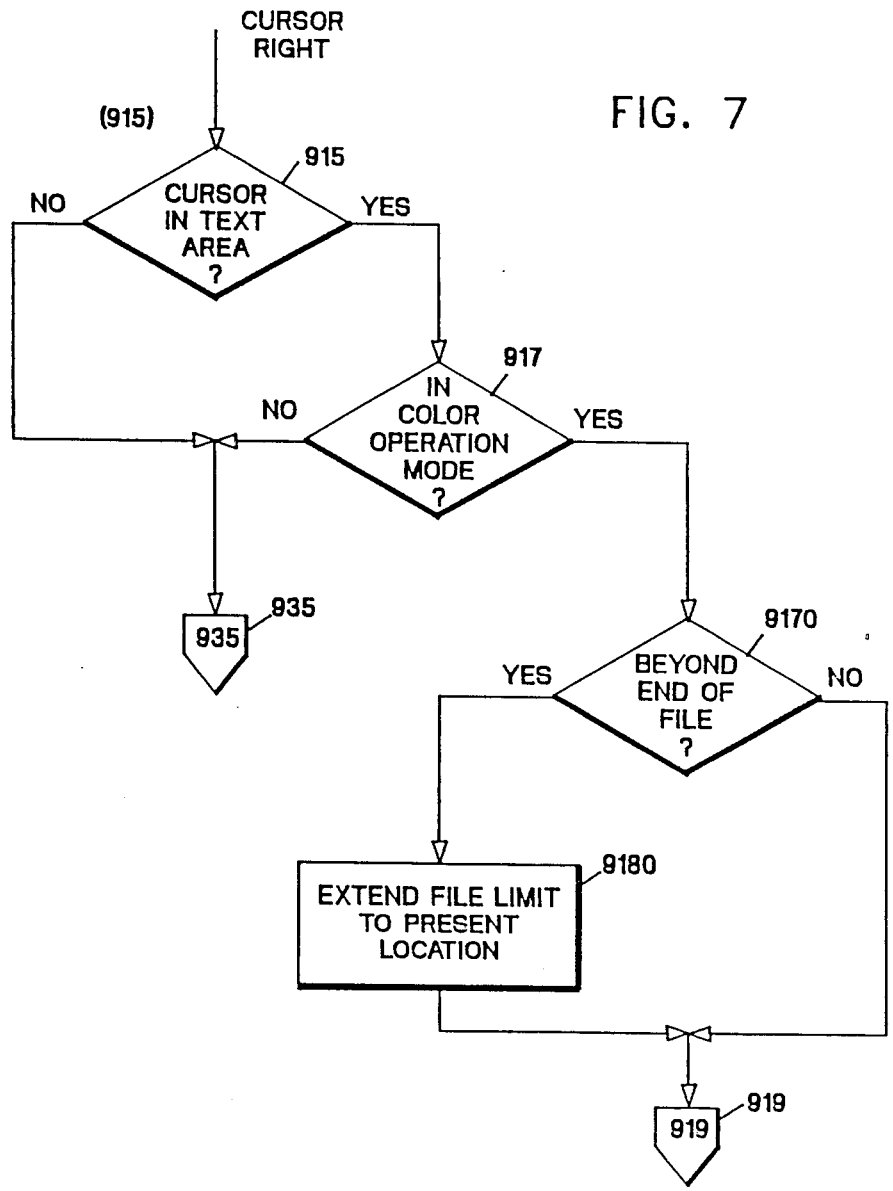
FIGS. 7, 8 and 9 are flowcharts showing the application logic associated with the key to move the cursor right.

FIG. 7 is a flowchart showing the application logic associated with the key to move the cursor right. Control enters from FIG. 3 at the decision block labeled 915, where a test for the location of the cursor is performed. If the cursor is not in the text area, control is passed to branch entry 935 in FIG. 9; however, if the cursor is in the text area, decision block 917 tests to see if the editor is in the color (operation definition) mode. If the editor is not in the color mode, then control is passed to branch label 935. If the editor is in the color mode, then another test is performed at decision block 9170 to determine if the cursor is beyond the end of the file. If the cursor is not beyond the end of the file, control is passed to branch entry 919 in FIG. 8. If the cursor is beyond the end of the file, the file limit is increased to extend to the present location of the cursor in function block 9180, and control is passed to branch entry 919.

Figure 8:
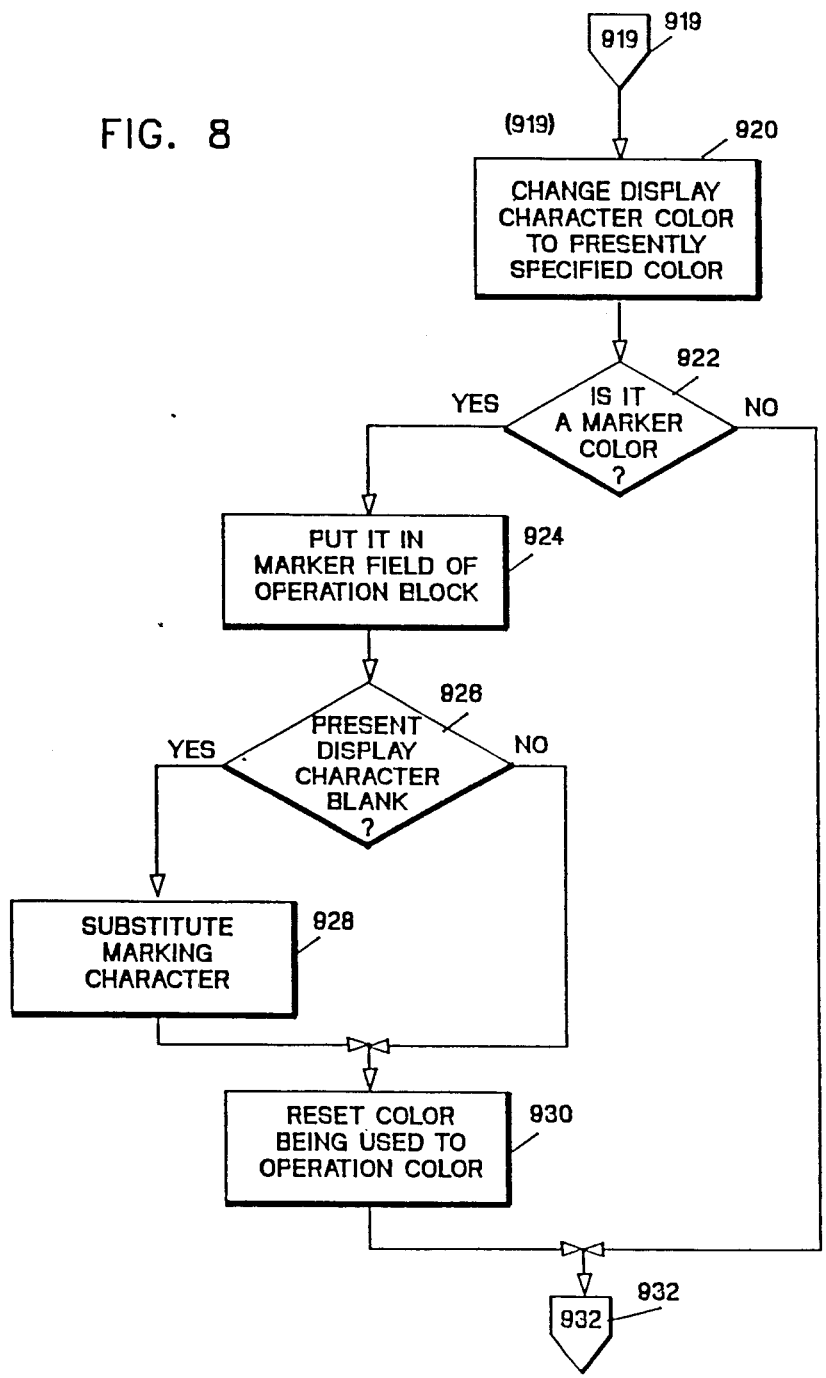

FIG. 8 shows the application logic associated with the cursor right key when the editor is in the color mode, which indicates that an editing function is to be defined. Control enters the branch label 919 from FIG. 3, and immediately enters function block 920, where the display character color is changed to the active color. Then a test is performed at decision block 922 to determine if the color is a marker color. If it is not a marker color, then control is passed to branch entry 932 in FIG. 9. If the color is a marker color, then it is saved in the marker field of the operation block in function block 924.

Next, a test is performed in decision block 926 to determine if the present character the cursor is under is a blank character. If the character is a blank, then a substitute marking character replaces it in function block 928. If the character is not a blank, then no action is taken. In either case, control flows to function block 930 where the active color, which now represents a marker color, is reset to the operation color. Then, control is passed to branch label 932.

Figure 9:
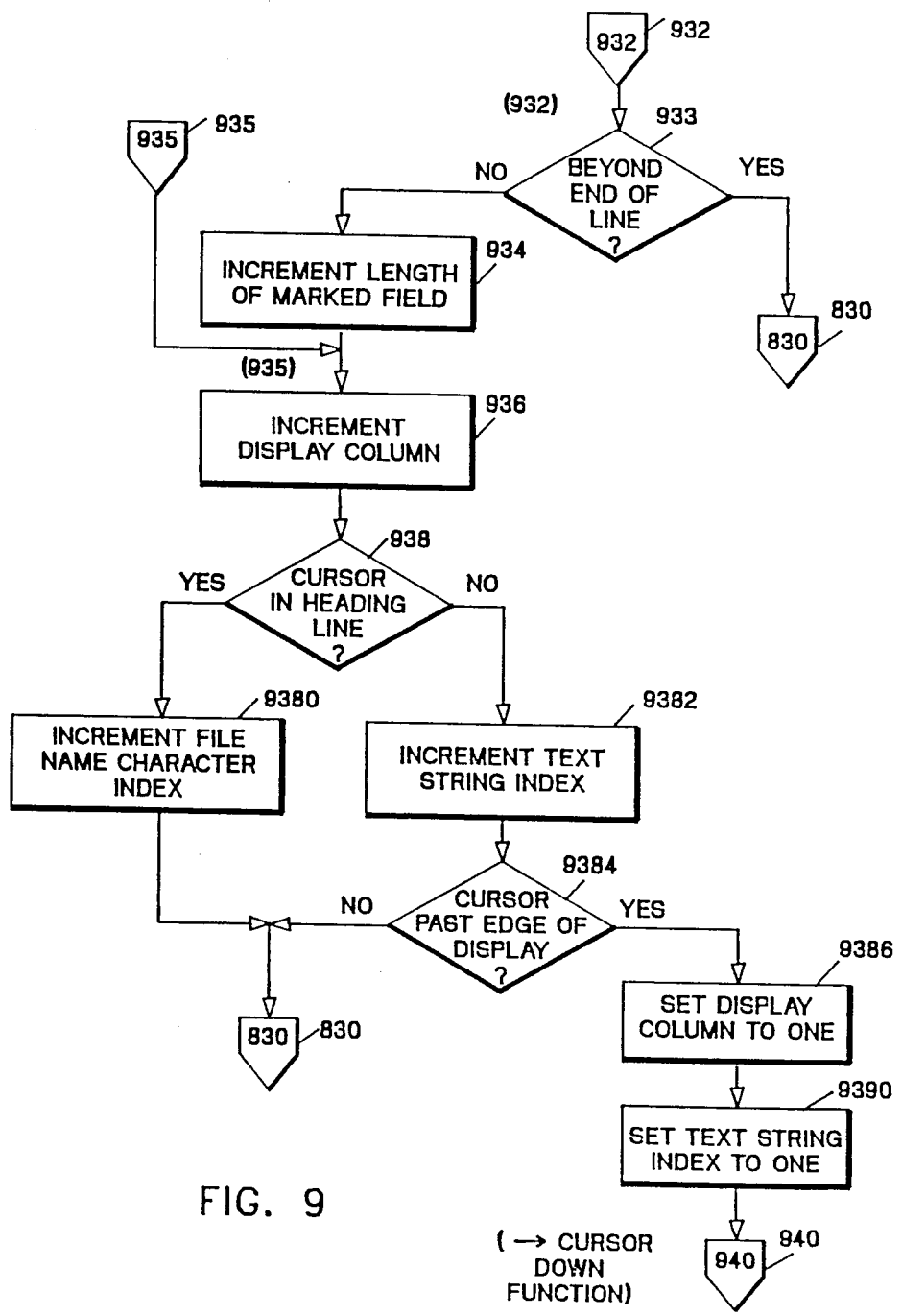

FIG. 9 continues the application logic involved for each movement of the cursor to the right. Control enters at branch label 932 and immediately a test is made in the decision block at 33 to see if the cursor is beyond the end of a line. If the cursor is beyond the end of the line, there is no more text to be operated upon here, and control is passed to branch entry 830 in FIG. 1b. If the cursor is not beyond the end of the line, control flows into the function block at 934 where the length of the marked field is incremented. Branch label 935 from FIG. 7 of the cursor right operation enters with the flow from function block 934 to function block 936 where the display column is incremented to the next position for data entry. Then a test is performed in decision block 938 to determine if the cursor is in the heading line. If the cursor is in the heading line, the file name character index is incremented to point to the next character entry position in function block 9380, and control is passed to branch entry 830. If the cursor is not in the heading line, the text string index is incremented to point to the next character entry position in the text area, and the cursor is tested for having reached the edge of the display in decision block 9384. If the cursor has passed the edge of the display then the display column is set to one in function block 9386, the text string is set to one in function block 9390, and control is passed to branch entry 940 in FIG. 6 for further processing by the cursor down application logic. If the cursor was not past the edge of the display, control flows to branch entry 830 for redisplay of the cursor at the appropriate row and column of the display.

Figure 10:
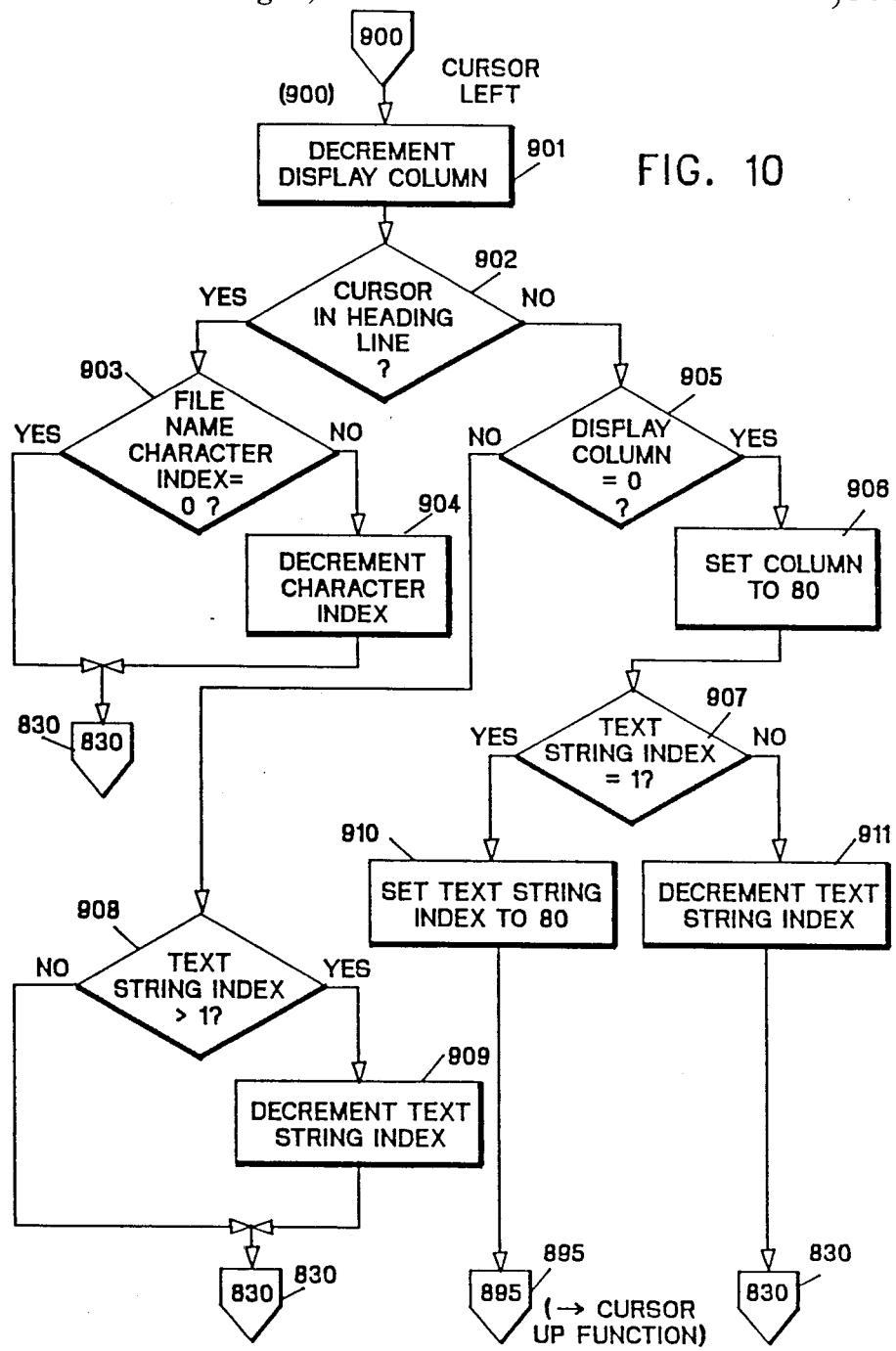
FIG. 10 is a flowchart showing the application logic associated with the key to move the cursor left.

FIG. 10 shows the application logic associated with the key to move the cursor left. Control flow enters, from FIG. 3, at the branch label 900 and immediately the display column is decremented in function block 901. A test is performed next to determine if the cursor is in the heading line at decision block 902. If the cursor is in the heading line, a test is performed to determine if the file name character index is equal to zero, indicating that the cursor is at the beginning of the field, in decision block 903. If the character index is not zero the cursor can be moved left, and the character index is decremented in function block 904 to indicate the movement. In either case, control is next passed to branch entry 830 in FIG. 1b for further processing.

If the cursor is determined not to be in the heading line in decision block 902, it indicates that the cursor is in the text area. Another test is then performed to determine if the display column is equal to zero in decision block 905. If the display column is not equal to zero, another test is performed at decision block 908 to determine if the text string index is greater than one. If the text string index is greater than one, indicating that there is text to be processed, then the text string is decremented in function block 909. Regardless of the status of the text string index, control next flows to branch entry 830 in FIG. 1b.

If the display column does equal zero in decision block 905, the column is set to eighty in function block 906, and the text string is tested to see if it equals one in decision block 907. If the text string index is equal to one, then the text string index is set to eighty (end of the line) in function block 910, and control is passed to branch entry 895 in FIG. 5 to move the cursor up to the preceding line, and reposition the cursor following the change. If the text string index is not equal to one in decision block 907, the text string index is decremented in function block 911, and control is passed to branch entry 830 to reposition the cursor following the change.

Figure 11:
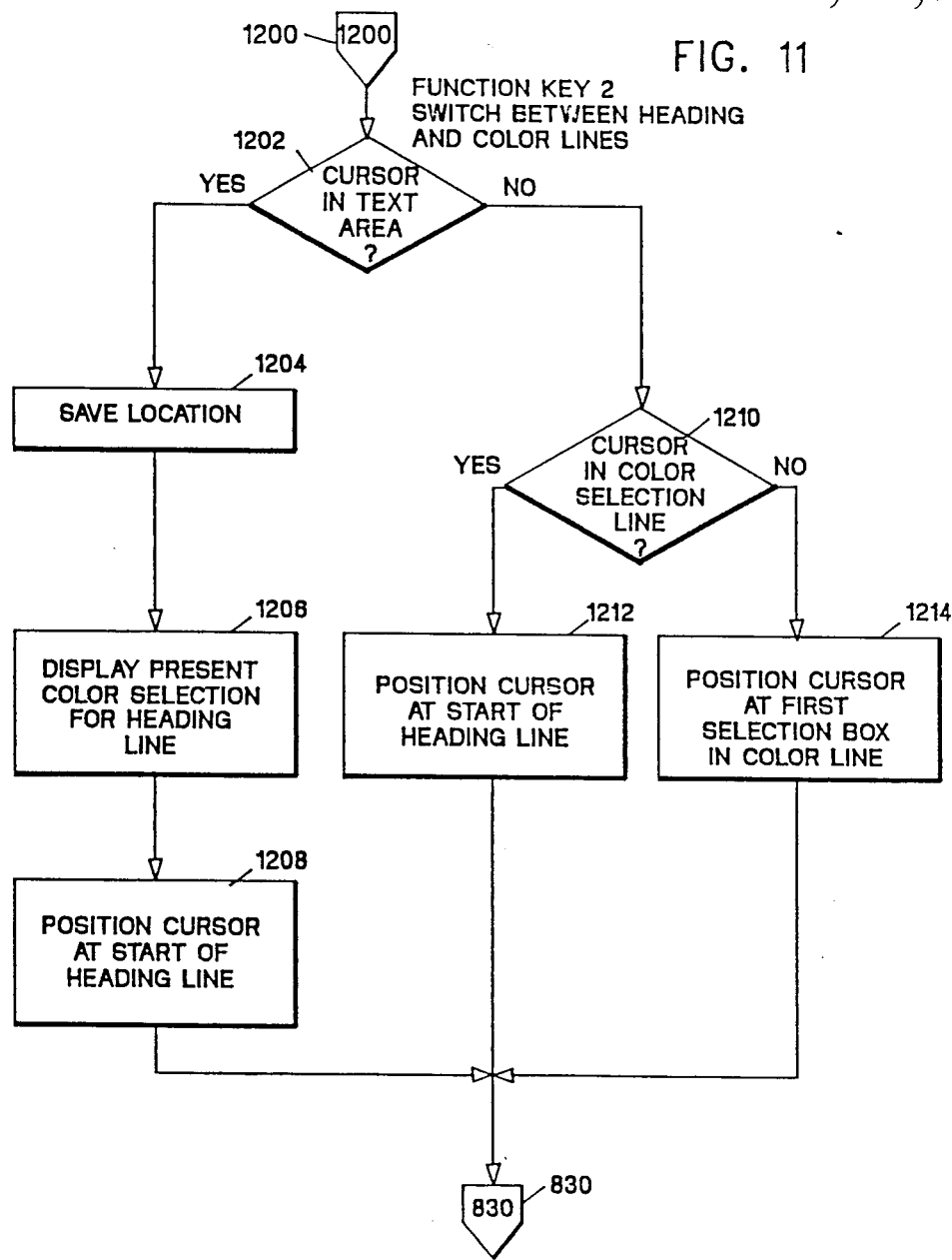
FIG. 11 is a flowchart showing the application logic associated with rotating control between a heading line and a color control line.

FIG. 11 is a flowchart showing the application logic associated with switching control to the heading line, and between the heading line and the color line. Control initially enters from the branch in FIG. 3 to label 1200, and immediately a test is executed in decision block 1202 to determine if the cursor is in the text area. If the cursor is in the text area, then the location of the cursor is saved in function block 1204, the current color selection for use in the heading line is displayed in function block 1206, and the cursor is positioned at the start of the heading line in function block 1208. Then control flows to branch entry 830 in FIG. 1b.

If the cursor is not in the text area at decision block 1202, another test is made to determine if the cursor is in the color line in decision block 1210. If the cursor is in the color line, the cursor is positioned at the start of the heading line in function block 1212, and control is passed back to branch entry 830. If the cursor is not in the color line, it is assumed to be in the heading line. In this case, the cursor is positioned at the first selection box in the color line in function block 1214, and control is passed to branch entry 830.

Figure 12:
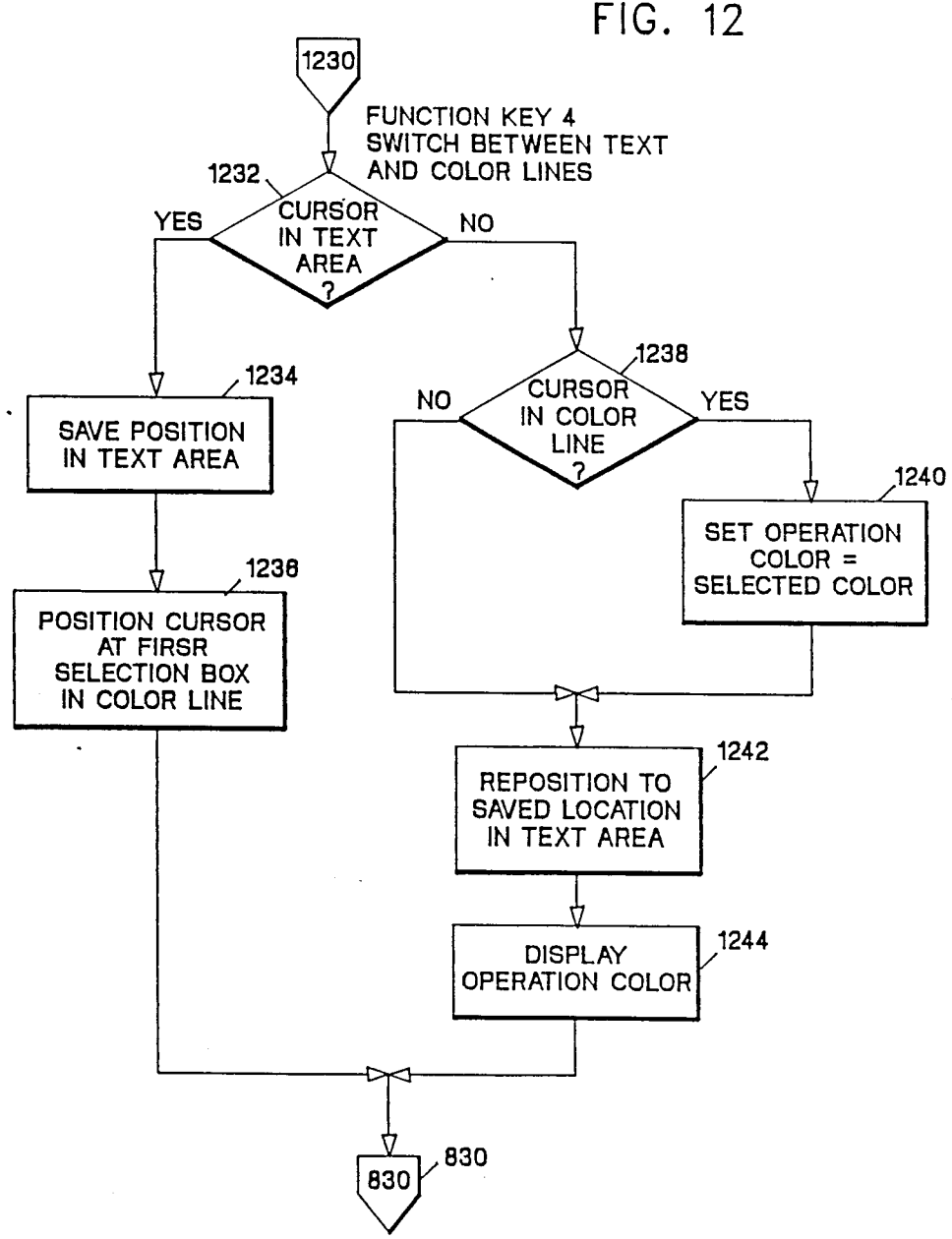
FIG. 12 is a flowchart showing the application logic associated with switching control between the text area and a color control line.

FIG. 12 is a flowchart showing the application logic associated with switching function to the text area, and between the text area of the application and the color line of the application. Control enters at branch label 1230 from FIG. 3, where a test is applied in decision block 1232 to determine if the cursor is in the text area. If the cursor is in the text area, the position of the cursor is saved in function block 1234 to allow the next switch to the text area to return the cursor to the same location. Then the cursor is positioned at the first selection box in the color line in function block 1236. Finally, control is passed to branch entry 830.

If the cursor is not in the text area when it is tested in the decision block 1232, another test is performed to check if the cursor is in the color line in decision block 1238. If the cursor is in the color line, the text operation color is set to the current active color, as shown in the active color block, in function block 1240. Whether the cursor is in the color line or not, the next step is to reposition the cursor to the saved location in the text area in function block 1242, display the operation color in function block 1244, and return control to the branch entry at 830 in FIG. 1b.

Figure 13:
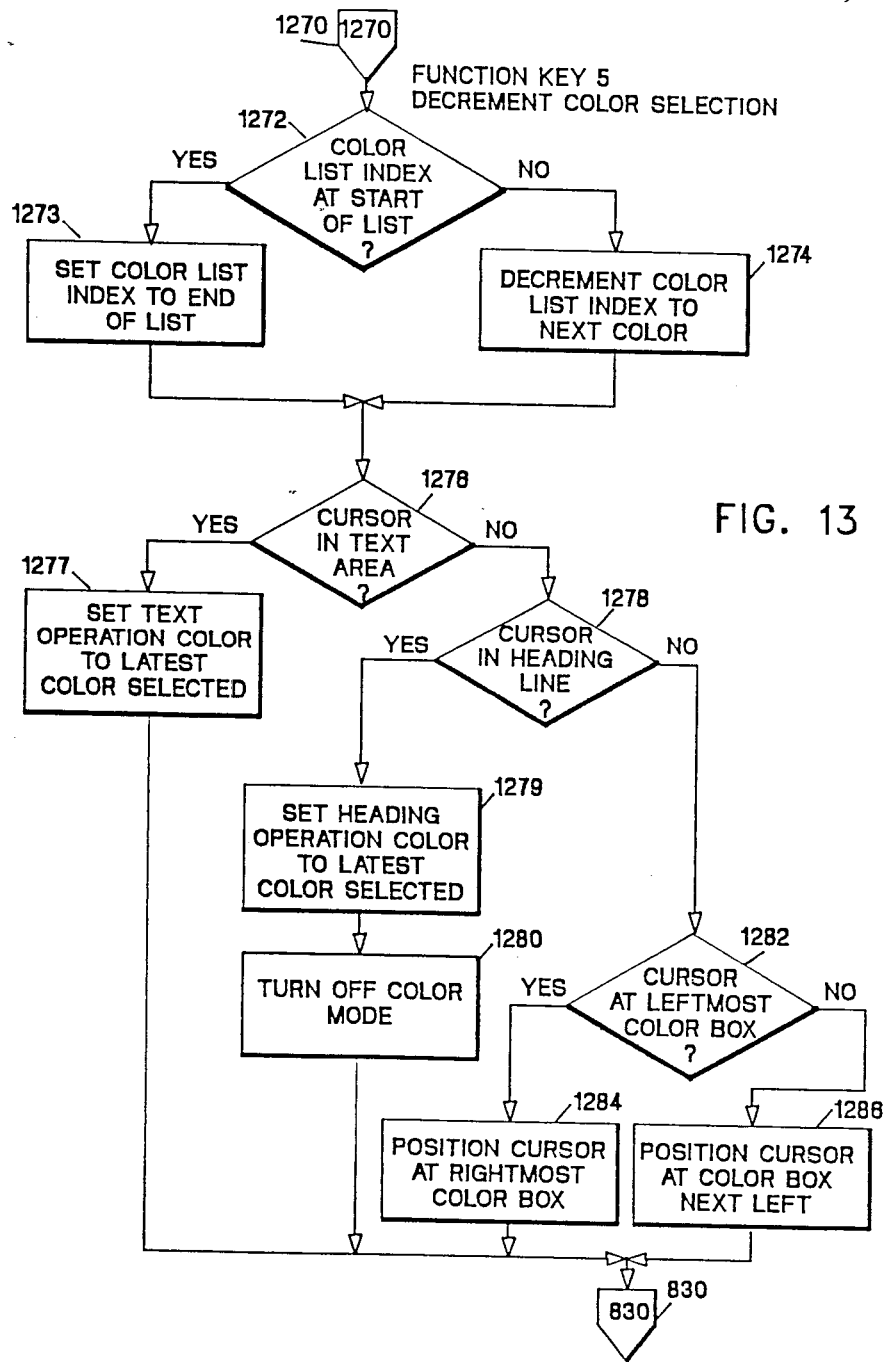
FIG. 13 is a flowchart showing the application logic associated with rotating the color selection in one direction through all the possible selections.

FIG. 13 shows the application logic associated with changing the color selection when function key five is pressed, by moving it in one direction through the list of possible colors. Control enters at branch label 1270 from FIG. 3, and enters a decision block at 1272 to determine if the index to color list entries is at the start of the list. If the index is at the start of the list, it is reset to the end of the list as indicated in function block 1273. If the index is not at the start of the list, the index is decremented to the preceding color in the list. In either case, a test is performed next to determine if the cursor is in the text area at decision block 1276.

If the cursor is in the text area, the color to be used for text operations is set to the color just selected in the list, in function block 1277. Then control is passed to branch label 830. If the cursor is not in the text area, a test is performed at decision block 1278 to determine if the cursor is in the heading line. If the cursor is in the heading line, the heading operation color is set to the color of the latest selection in function block 1279. Then the color mode is turned off, indicating that no file operations are being defined, in function block 1280, and control is passed to branch entry 830. If the cursor is not in the heading line, then it must be in the color line, and an additional test is performed to determine if the cursor is in the leftmost color box in decision block 1282. If the cursor is in the leftmost color box, then the cursor is repositioned at the rightmost color box in function block 1284. If the cursor is not positioned at the leftmost color box, then the cursor is repositioned to the color box that is next on the left in function block 1286. Regardless of the branch taken in decision block 1282, the flow of control after the cursor is positioned in function block 1284 or 1286 is to branch entry 830.

Figure 14:
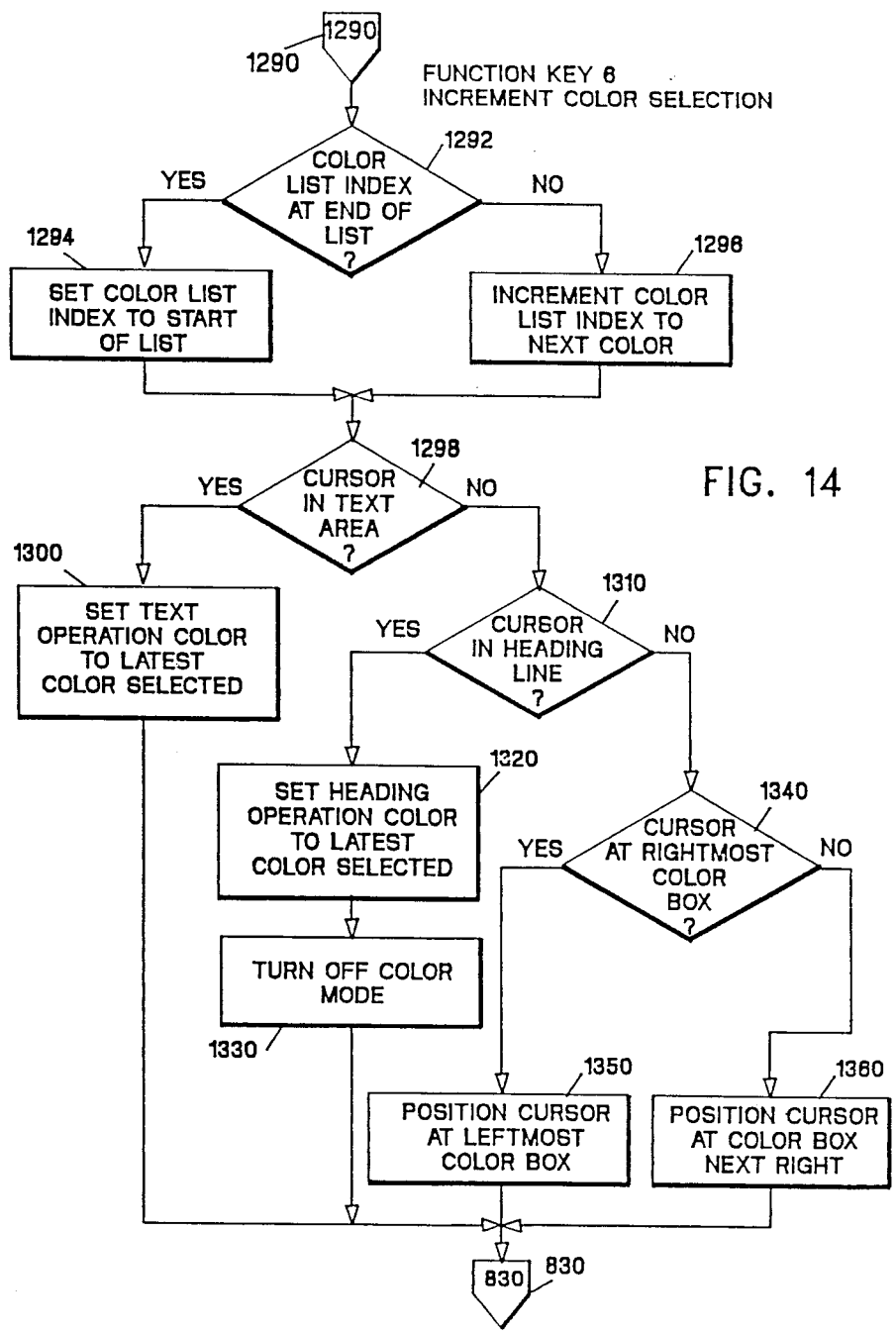
FIG. 14 is a flowchart showing the application logic associated with rotating the color selection in an opposite direction through all the possible selections.

FIG. 14 shows the application logic associated with changing the color selection when function key six is pressed, by moving it through the list of possible colors in the opposite direction from that associated with function key five. Control enters from branch label 1290 in FIG. 3, and enters a decision block at 1292 to determine if the color list scan index is at the end of the list. If the index is at the end of the list, it is reset to the start of the list as indicated in function block 1294. If the color list index is not at the end of the list, the color list index is incremented to the next color in the list. In either case, a test is performed next to determine if the cursor is in the text area at decision block 1298.

If the cursor is in the text area, the text operation color is set in function block 1300 to the color just selected above, and control is passed to branch entry 830. If the cursor is not in the text area, a test is performed at decision block 1310 t determine if the cursor is in the heading line. If the cursor is in the heading line, the heading operation color is set to the color of the latest selection in function block 1320. Then the color mode is turned off, i.e., set to indicate that no file operations are being defined, in function block 1330, and control is passed to branch entry 830. If the cursor is not in the heading line, it must be in the color line, and an additional test is performed to determine if the cursor is in the rightmost color box in decision block 1340. If the cursor is in the rightmost color box, then the cursor is repositioned at the leftmost color box in function block 1350. If the cursor is not positioned at the rightmost color box, then the cursor is repositioned to the color box that is next on the right in function block 1360. Regardless of the branch taken from decision block 1340, the flow of control after the cursor is positioned in either function block 1350 or 1360 is to branch entry 830.

Figure 15:
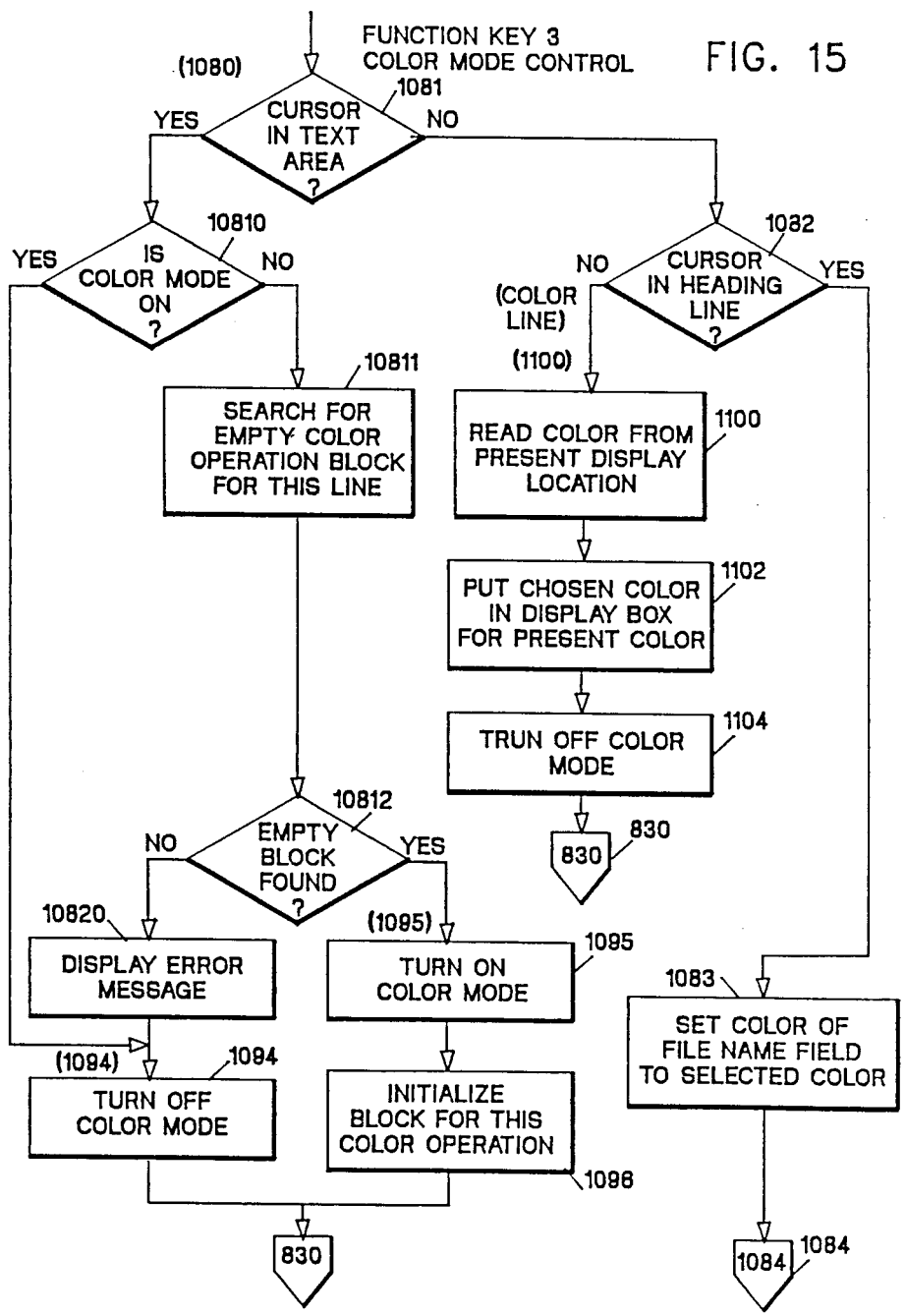
FIG. 15 is a flowchart showing the application logic associated with the control of the color mode function.

FIG. 15 is a flowchart showing the application logic associated with control of the color mode. Control enters from FIG. 3 at branch label 1080, where a test is performed in decision block 1081 to determine if the cursor is in the text area. If the cursor is in the text area, then another test is performed at decision block 10810 to determine if the color mode is on.

If the color mode is set on at this point, a text editing operation is being defined by color input, and this activation of Function key three ends the operation definition function. Control in this case is passed to function block 1094, where the color mode (and therefore the definition of an operation) is turned off. Control then returns to branch entry 830 in FIG. 1b.

If the color mode is not on, the operation definition function is being initiated. An operation block is needed to hold the specification of the operation being defined, until it is executed. In function block 10811 the editor searches for an empty operation block among the set of such blocks which are predefined in this preferred embodiment. In decision block 10812 a check is made to ensure that an empty block was available; if not, this editor's capacity for operations on the specific line being modified has been exceeded. In this case, in function block 10820 an error message is displayed in the message field at the right end of the heading line. Control then passes to function block 1094, where the color mode is turned off, and then returns to branch entry 830 in FIG. 1b.

If the test in decision block 10812 shows that an empty operation block was found, the color mode is turned on in function block 1095, to start the operation definition. In function block 1096 the operation block just found is initialized for the text editing operation being defined, and control is returned to branch entry 830 in FIG. 1b.

If the cursor is not in the text area in decision block 1081, then an additional test is performed in decision block 1082 to determine if the cursor is in the heading line. If the cursor is in the heading line, the file name field is set to the active color, and control is passed to branch entry 1084 in FIG. 16. If the cursor is not in the heading line, it is in the color line. In this case the color displayed in the block at the current cursor location in the line is read in function block 1100, and is placed in the display box indicating the active color in function block 1102. Then the color mode is turned off in function block 1104, establishing the normal text input mode, and control is returned to branch entry 830.

Figure 16:
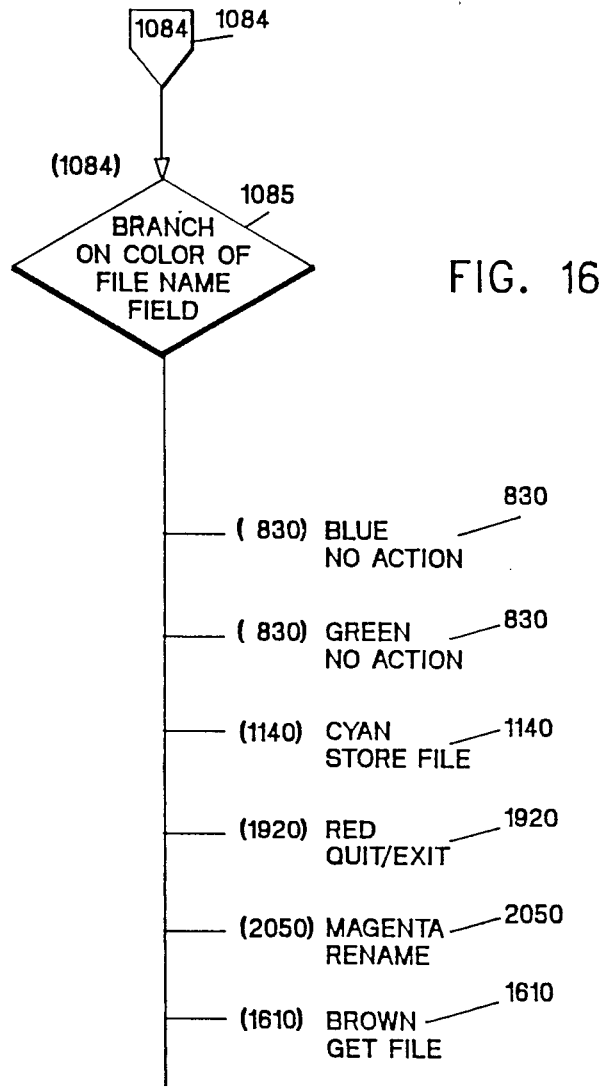
FIG. 16 is a flowchart showing the file function selection application logic associated with a branch based on color.

FIG. 16 is a flowchart showing the branch based on the color to select various file functions. Control enters at branch entry 1084, where a test is performed in decision block 1085 to determine which color (operation) has been specified in the file name field. If the color of the file name field is blue or green, then control is returned to 830 and no operation is performed. If the color of the file name field is cyan, then control is passed to branch label 1140 where the text that has been entered is stored in a file with the name specified. If the color of the file name field is red, then control is passed to branch label 1920 where the current session is Quit without saving any modifications. If the color of the file name field is magenta, then control is passed to branch label 2050 where preparations are made to rename the file. If the color of the file name field is brown, then control is passed to branch label 1610 to retrieve the file from secondary storage.

FIG. 16 represents an excellent example of the use of color to distinctly differentiate between operations on a common data entry field. Depending on the color of the file name field, a Save, Quit, Rename or Get operation occurs. The color of the file name field uniquely specifies the operation that should be performed on the particular file.

Figure 17:
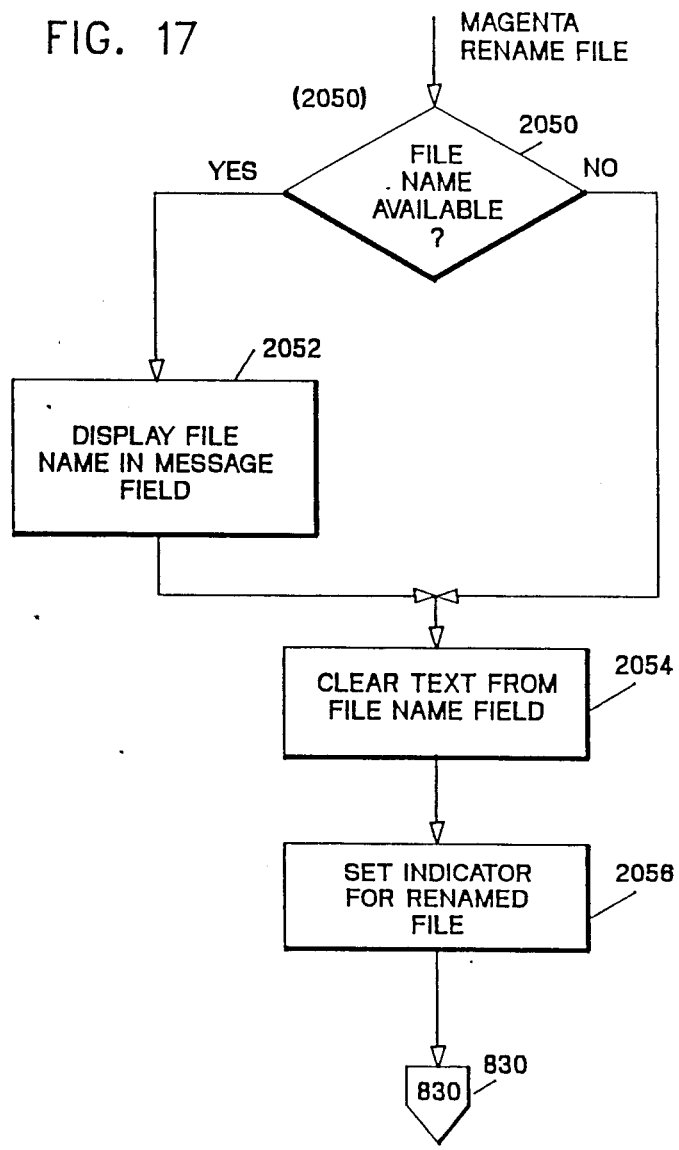
FIG. 17 is a flowchart showing the application logic associated with renaming a file.

FIG. 17 is a flowchart showing the application logic associated with the color magenta, which begins the function of renaming a file. Control enters from FIG. 16, at decision block 2050, where a test is performed to determine if a name is already associated with this file. If a name is associated with the file, the file name is displayed in the message field in function block 2052. Whether or not a file name is available, the next operation is to clear any text from the file name field as indicated in function block 2054. Then a file type flag is set to indicate that the current text is being renamed in function block 2056, and control is returned to branch entry 830.

Figure 18:
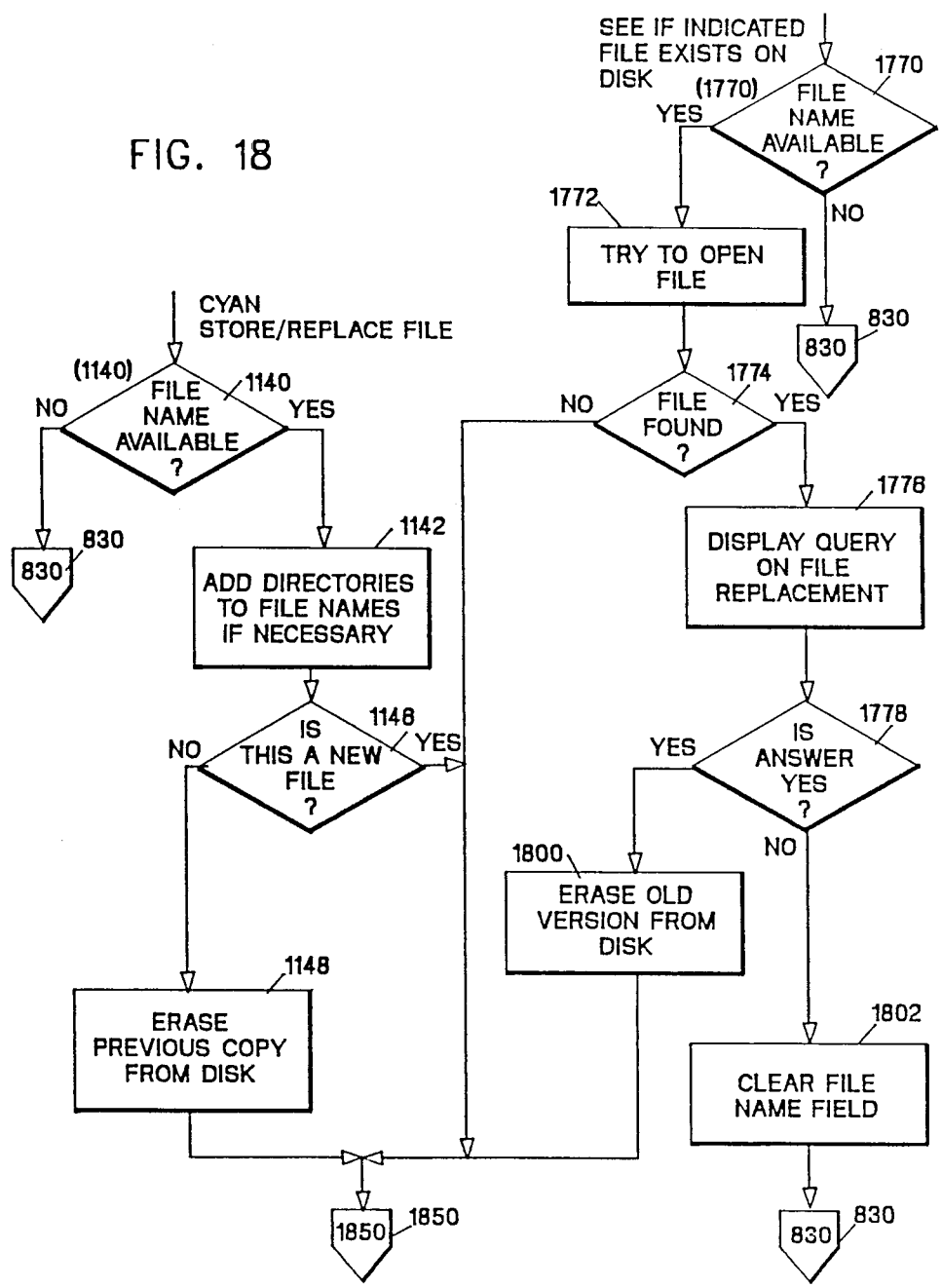
FIG. 18 is a flowchart showing the application logic associated with preparations to store or Rename a file.

FIG. 18 is a flowchart showing the application logic associated with preparations to store or rename a file. Control enters from the branch for the color Cyan in FIG. 16 at decision block 1140, where a test is performed to determine if a file name exists in the file name field. If a file name does not exist, then control is returned to branch entry 830 in FIG. 1b. If a file name is available, then additional directory information is added to the file name in function block 1142 if necessary to provide a complete path specification, and a test is performed to determine if this is a new file at decision block 1146. If the file is not a new one, then the previous copy of the file is erased from secondary storage as indicated in function block 1148, and control is passed to 1850. If the file is a new file then control is passed directly to 1850 in FIG. 19.

FIG. 18 also includes the logic to store a renamed file on secondary storage. Control for this section enters from FIG. 4 at function block 1770 where a test is performed to determine if a file name exists in the file name field. If not, then control is passed to branch label 830. If a file name does exist, then an attempt is made to open the file at function block 1772, and a test is performed at decision block 1774 to determine if the file was found on secondary storage. If the file was not found, then control is passed to 1850. If the file was found, then a message is displayed in function block 1776, prompting the user to determine if the existing file in storage should be replaced with the one just renamed. A test is then performed at decision block 1778 to check the user's reply to the prompt, and determine if the user really desires to overwrite the file. If the user actually desires to overwrite the file, the old version is erased from secondary storage at function block 1800, and control is passed to 1850. If the user does not desire to overwrite the existing file, then the file name field is cleared in function block 1802, and control is returned to branch label 830.

Figure 19:
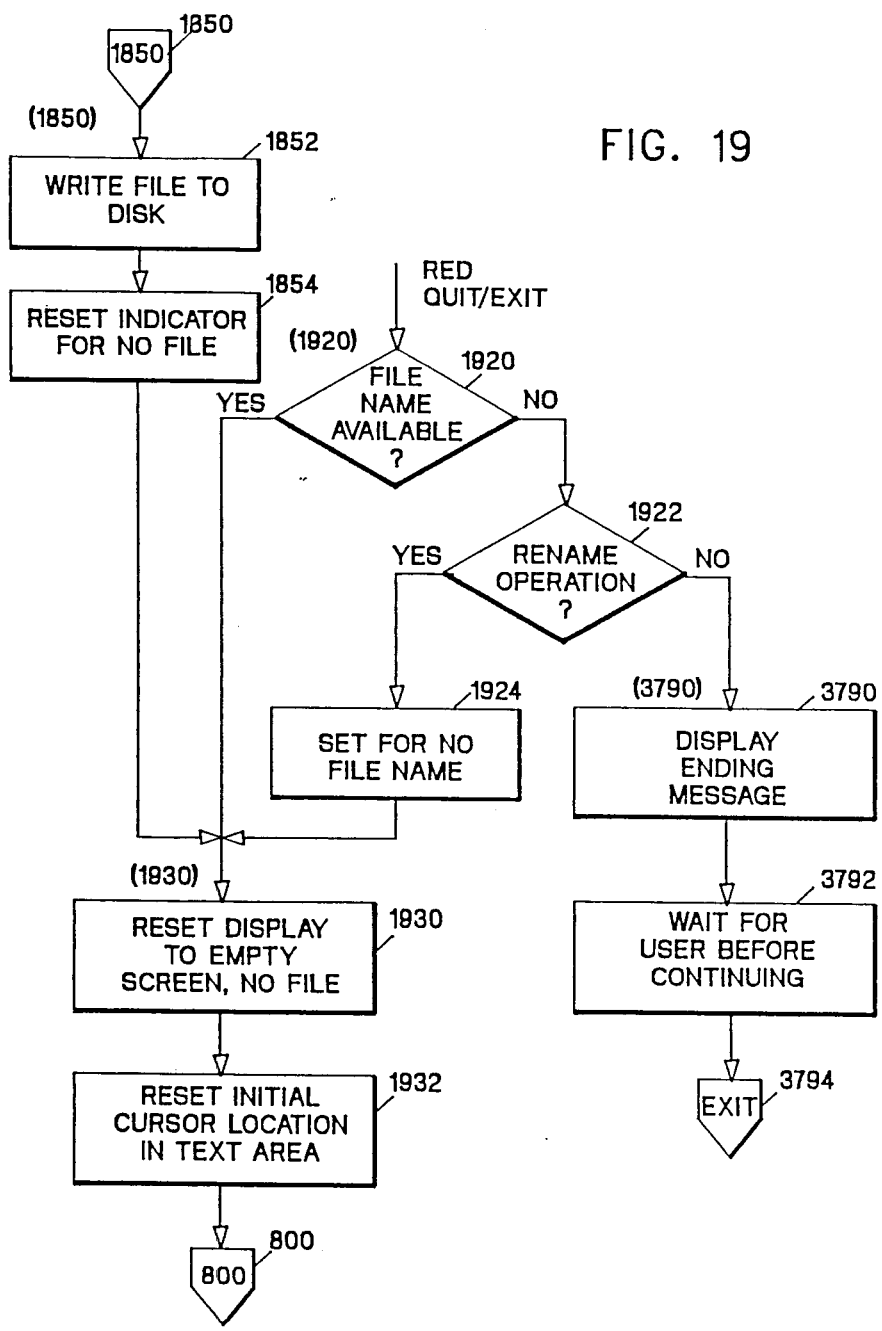
FIG. 19 is a flowchart showing the application logic associated with storing a file and exiting the application.

FIG. 19 is a flowchart showing the application logic associated with storing a file and exiting the application. Control enters from FIG. 18 at entry label 1850 where the application writes the text to the specified file name on secondary storage as indicated in function block 1852. Next, a file type flag is set to indicate that no file is present in function block 1854, and the display is cleared in function block 1930. The cursor is then returned to the initial home position in function block 1932, and control is returned to branch entry 800 in FIG. 1b.

FIG. 19 also shows the application logic associated with exiting the application, which is activated by the color red. Control for this section enters from FIG. 16 at decision block 1920 where a test is performed to determine if a file name exists in the file name field. If a file name does exist, then the display i cleared in function block 1930, the cursor is reset to the initial home position in 1932, and control is returned to branch label 800. If no file name is available, then a test is performed in decision block 1922 to determine if a Rename operation is being performed. If the user has initiated a Rename operation, then a file type flag is set to indicate that no file exists in function block 1924, the display is cleared in function block 1930, the cursor is reset to the home position in function block 1932, and control is returned to branch entry 800. If a Rename operation was not being performed, then an ending message is displayed in function block 3790, a momentary pause is performed in function block 3792, and the application is exited in branch label 3794 as soon as the user presses the enter key.

Figure 20:
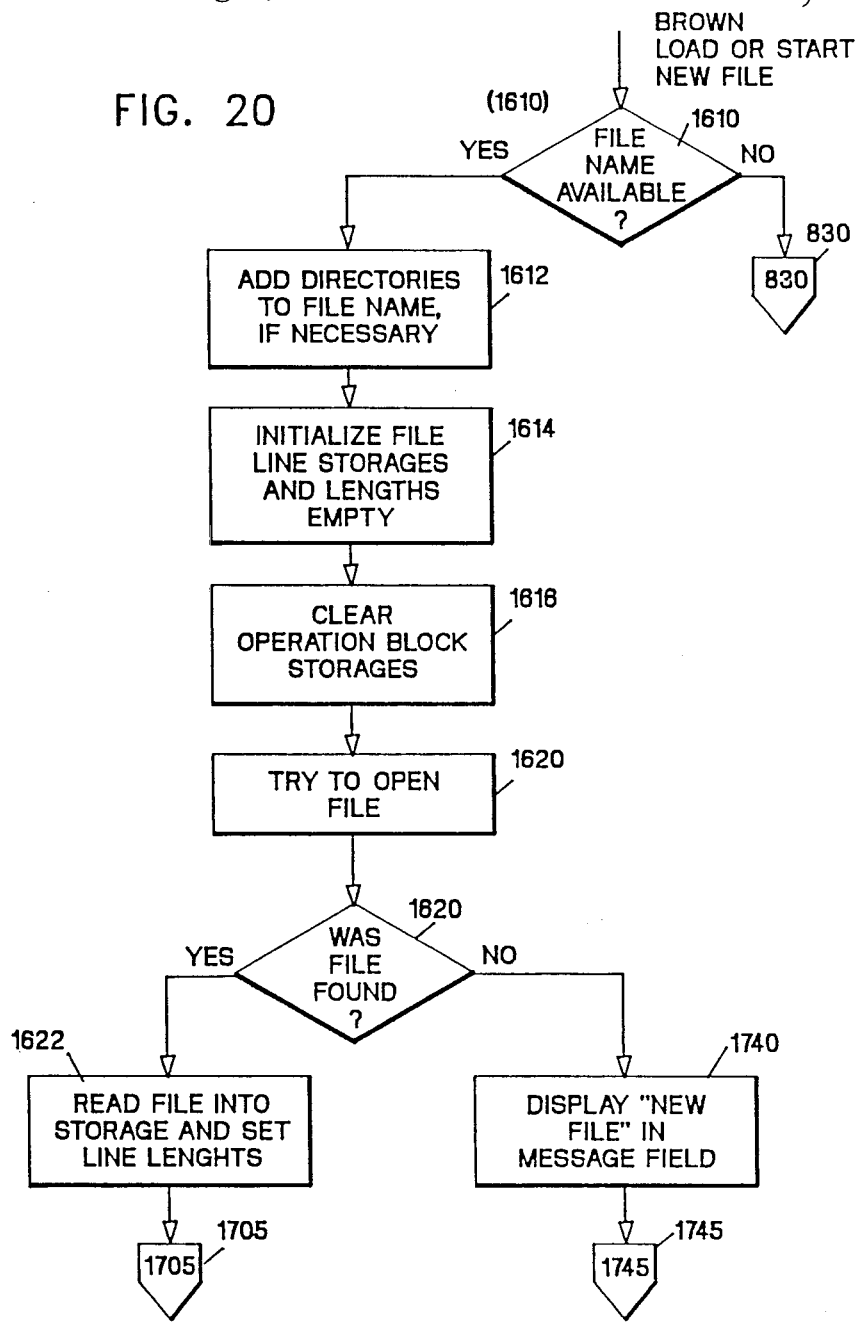
FIG. 20 is a flowchart showing the application logic associated with retrieving an existing file or creating a new file.

FIG. 20 is a flowchart showing the application logic associated with obtaining an existing file or creating a new file, which is activated by the color brown. Control enters from FIG. 16 at decision block 1610 where a test is performed to determine if a file name exists in the file name field. If a file name does not exist, control is passed to branch entry 830. If a file name is available, then the necessary directory information is added to the file name in function block 1612 to provide a complete path specification, the storage arrays for file lines are initialized in function block 1614, and the predefined operation block storages are initialized in function block 1616. Then an attempt to open the file is performed in function block 1618, and a test is performed to determine if the file was found in decision block 1620. If the file was found, the information from the file is read into the file line storage arrays for processing in function block 1622, and control is passed to branch entry 1705 in FIG. 21. If the file was not found, a message is displayed indicating that this is a new file in function block 1740, and control is passed to 1745 in FIG. 21.

Figure 21:
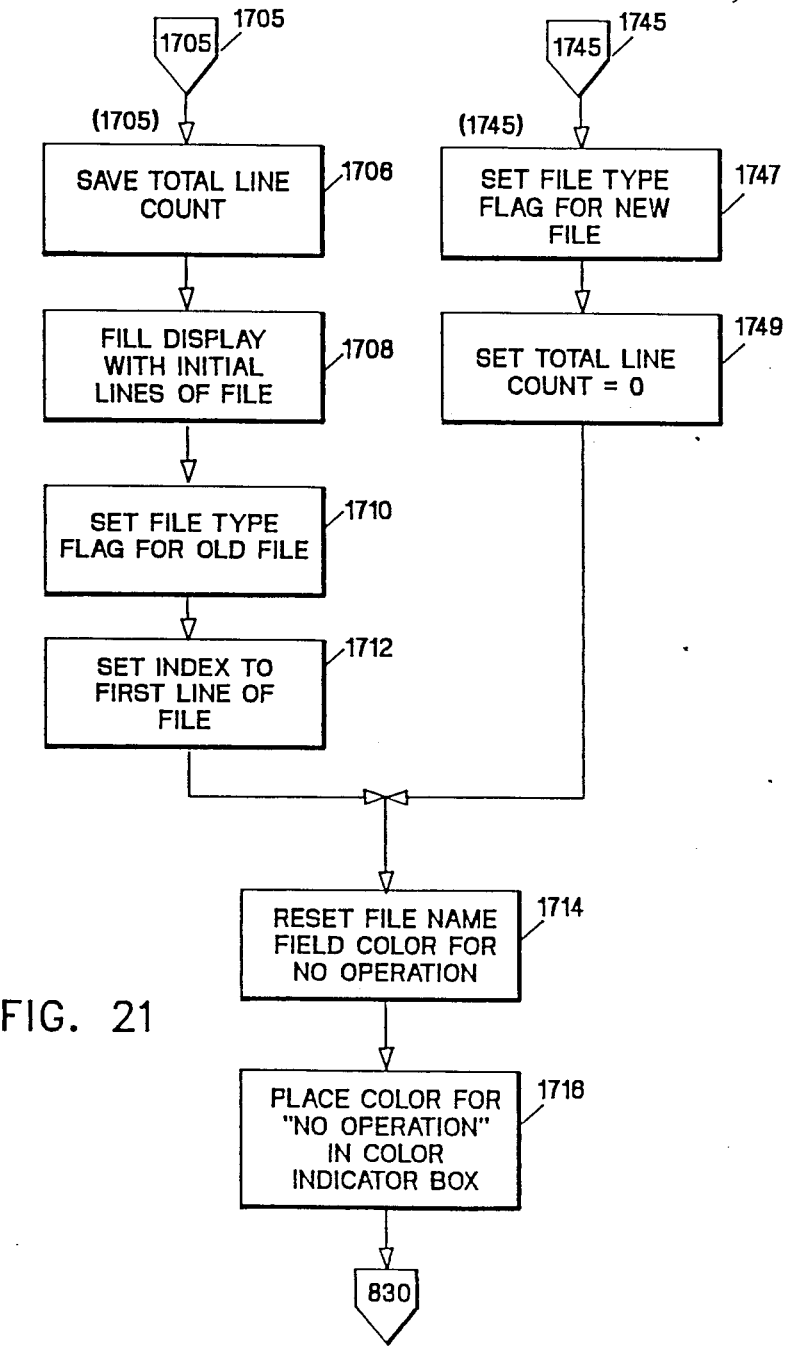
FIG. 21 is a flowchart showing the application logic associated with preparation to edit a file.

FIG. 21 is a flowchart showing the application logic associated with preparation to edit a file. Control enters from FIG. 20 at branch label 1705, just after a file has been read into storage. The first operation performed is the saving of the total number of lines of text at function block 1706. Then, the initial lines of text in the file are written onto the display in function block 1708, the file type flag is set to indicate this is an old file in function block 1710, and a file index is set to point to the first line of the file in function block 1712.

If the file is a new file control enters from FIG. 20 at branch entry 1745, where the file type flag is set to indicate a new file in function block 1747, and the total line count is set to zero in function block 1749. Following the initialization processes described above, control flows from both function block 1749 and function block 1712 into function block 1714, where the color in the file name field is reset to the color indicating no operation here. The color for "no operation" is also placed in the active color box in function block 1716. Control then passes to branch entry 830 in FIG. 1b.

Figure 21A:
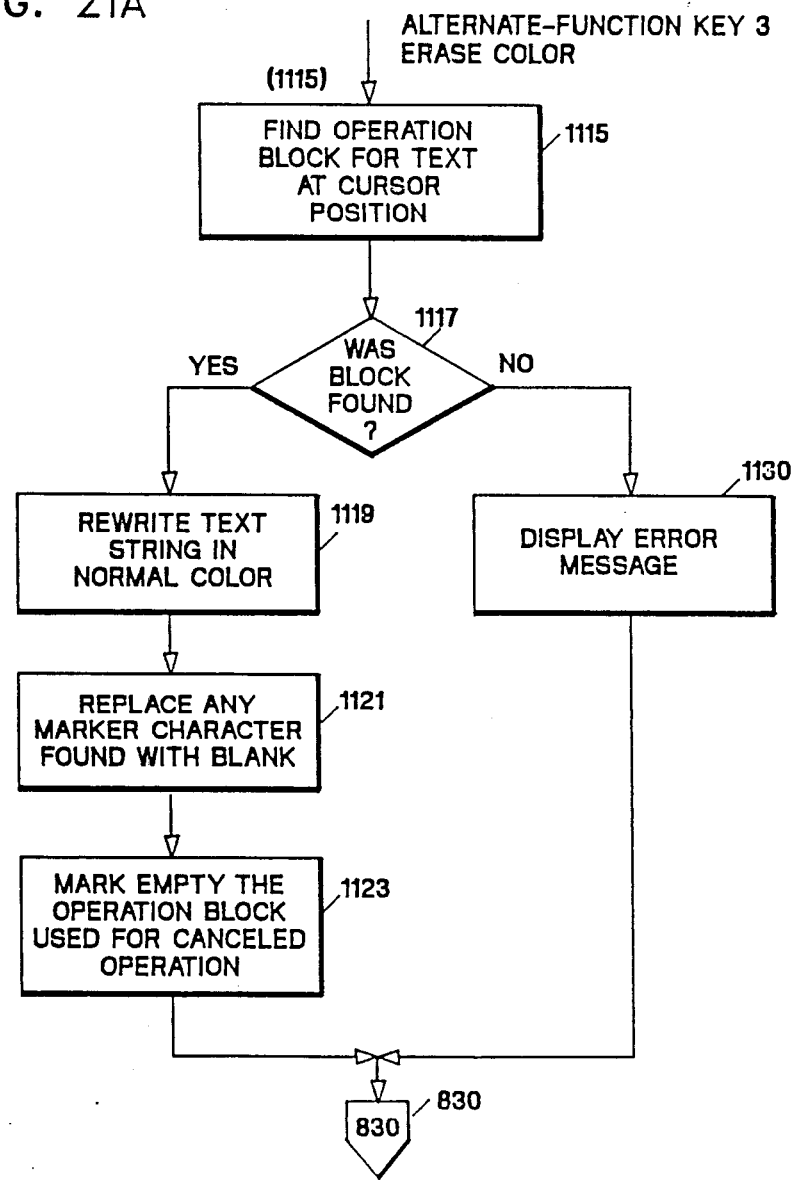
FIG. 21a is a flowchart showing the application logic associated with the cancellation of an operation which has been partly or entirely defined, but not yet executed.

FIG. 21a is a flowchart showing the application logic associated with the function to cancel an operation which is defined but not yet executed. This function is activated by the alternate function three key. The control for the function enters at function block 1115, where a search is made for the operation block associated with the text at the cursor location. A test is performed in decision block 1117 to determine if an operation block was found. If not, then an error message is displayed in function block 1130 and control is passed to branch entry 830. If an operation block was found, the string of text displayed in the color of the operation and in any marker color is rewritten onto the display in normal text color in function block 1119. Any special marker character displayed within the material associated with the operation being canceled is replaced with a blank (the character for which the marker was originally substituted) in function block 1121. The internal operation block containing the specification of the operation being canceled is then marked as unused in function block 1123, and control is returned to branch entry 830 in FIG. 1b.

Figure 22:
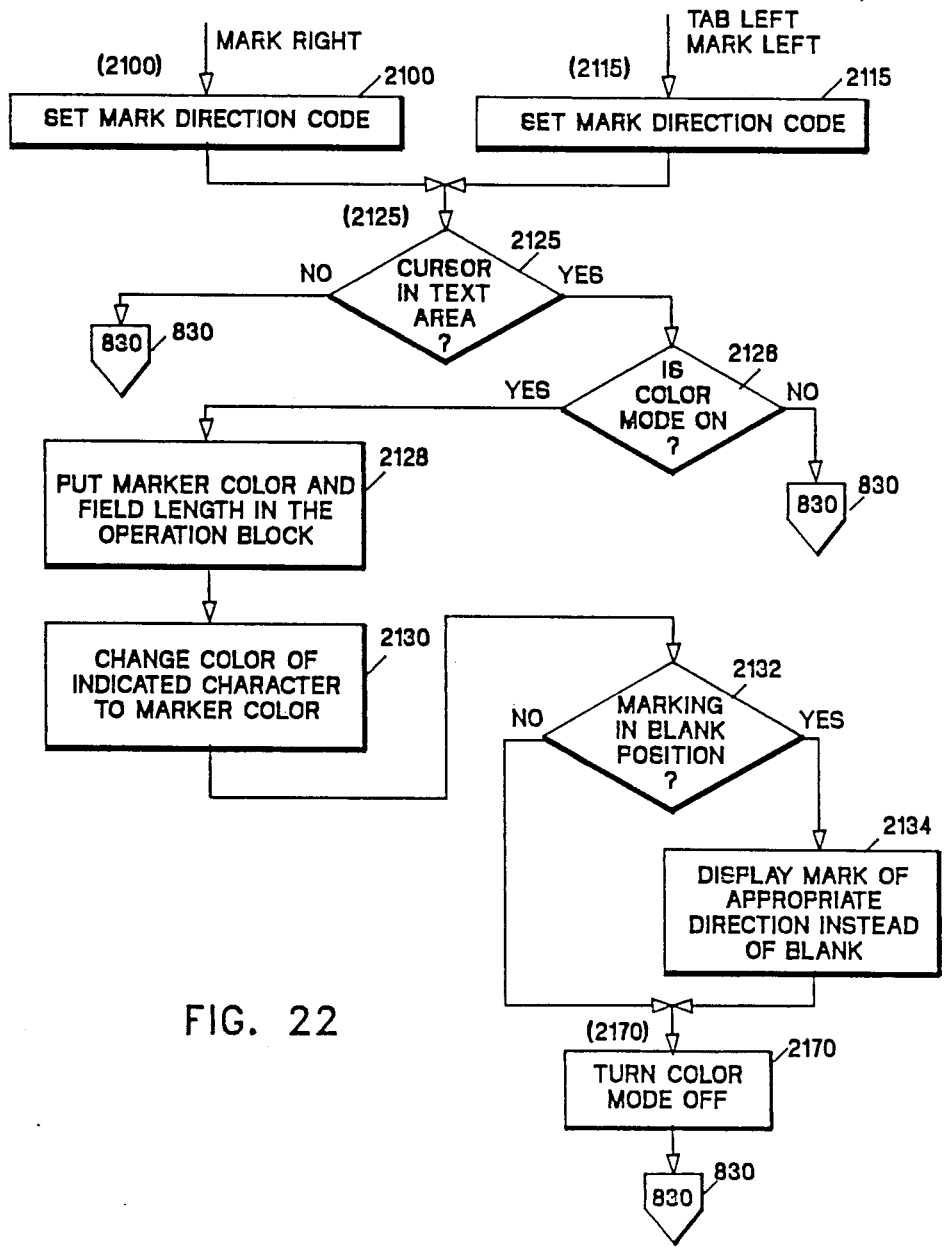
FIG. 22 is a flowchart showing the application logic associated with marking a destination point for the movement of text.

FIG. 22 is a flowchart showing the application logic associated with marking a destination point for the movement of text. Control enters from FIG. 3 at either function block 2100 for the Tab Right input signal or function block 2115 for the Tab Left input signal. Both of these inputs, as noted earlier in this document, are used to tell the editor to record the present cursor location as a destination point to which text can be copied or moved, and mark this location on the display with the present marker color. As also noted earlier, the side of the marker position is significant in defining the location; a user may wish to move text to a point immediately following the character preceding (to the left of) the marker (i. e., starting at the left side of the marker), or to a point immediately following the marker (starting at its right side). In function block 2100 the Tab Right signal causes the editor to place a code in the operation block for the marker which specifies that the significant position is on the right side of the marker. In function block 2115 the Tab Left signal causes the editor to place a code in the operation block for the marker which specifies that the significant position is on the left side of the marker.

In either case, control flows to the decision block at 2125 where a test is performed to determine if the cursor is in the text area. If the cursor is not in the text area, then control is returned to branch label 830. If the cursor is in the text area, a test is performed in decision block 2126 to determine if the color mode is on, i.e., an operation is being defined. If the color mode is not on, control is returned to branch entry 830. However, if the color mode is on, the marker color and field length are put into the operation block in function block 2128, and the color of the character at the present cursor location is changed to the present active color, which is being used as a marker color, in function block 2130. Then, a test is performed to determine if the marking is at a blank character in decision block 2132. If the character is blank, a marker character (a small arrowhead) which indicates the significant side of the marking position is displayed in function block 2134. Whether the mark is blank or not, control flows to function block 2170, where the color mode, and consequently the operation definition function, is turned off. Then, control is returned to branch entry 830 in FIG. 1b.

Figure 23:
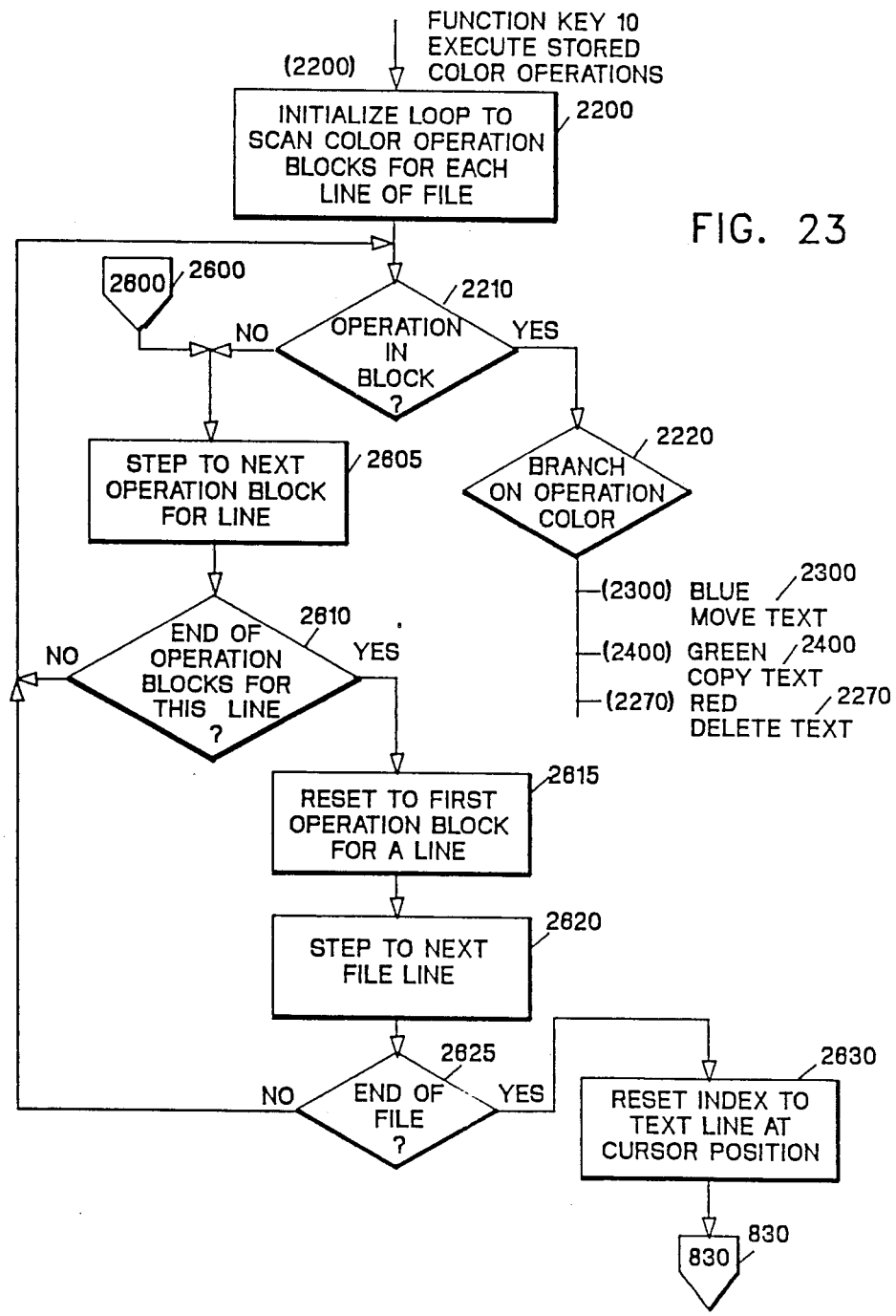
FIG. 23 is a flowchart showing the application logic associated with the execution of one or more predefined color operations.

FIG. 23 is a flowchart showing the application logic associated with the execution of one or more predefined color operations. Control enters from FIG. 3 at function block 2200, where a loop is initialized to scan the array of predefined operation blocks, searching for those which contain operations to be executed at this point. A test is performed in decision block 2210 to determine if a specific block contains an operation to be performed. If an active operation block is found, then decision block 2220 branches based on the operation color (type) to branch label 2300 if a blue (Move) operation is found, 2400 if a green (Copy) operation is found, or 2270 if a red (Delete) operation is found. If a given operation block is found to be empty in decision block 2210, or when control returns to branch entry 2600 from FIGS. 24, 25 and 26 then function block 2605 is executed, stepping to the next operation block for a particular line. Then a test is performed in decision block 2610 to determine if that was the last operation block for the line. If that was not the last operation for the line, then control is passed back to decision block 2210 to continue the search for the next active operation block. If that was the last operation for the line, control is passed to function block 2615, where the processing is reset to the first operation block for a line. Then a scan index identifying the group of operation blocks for a specific file line is incremented in function block 2620, and a test is performed to determine if this is the end of the file in decision block 2625. If it is not the end of the file then control is passed back to decision block 2210 to continue the search for the next active operation block. However, if this is the end of the file, then an index to the file line associated with the current cursor location is reset, and control is returned to branch entry 830.

Figure 24:
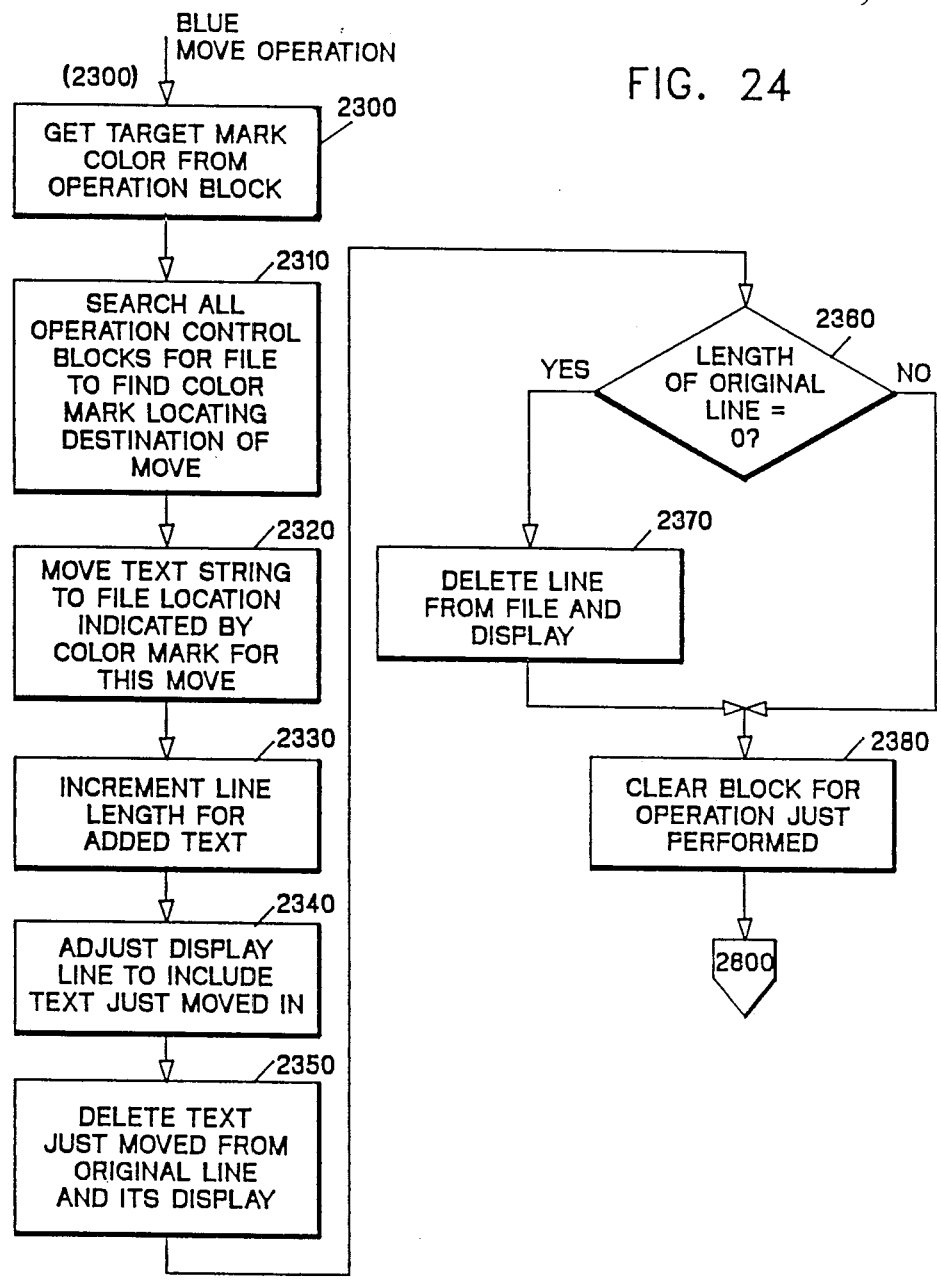
FIG. 24 is a flowchart showing the application logic associated with the execution of a Move operation.

FIG. 24 is a flowchart showing the application logic associated with the execution of a Move text operation, which is activated by the color blue. Control enters from FIG. 23 at function block 2300 where the target mark color is obtained from the operation block. Then all operation control blocks are searched, to find the destination of the Move operation, in function block 2310. The next operation moves the text string identified in the operation block to the file location indicated by the color mark for this move, in function block 2320. The length of the destination line for this move is incremented in function block 2330 to accommodate the additional text. Function block 2340 adjusts the display to include the text just moved to the new location, and in function block 2350, the text is deleted from the original location. A test is performed next to determine if the length of the original line became zero as a result of the deletion just performed in decision block 2360. If the length is zero, the line is deleted from the file and the display in function block 2370. Whether or not the original line is deleted from the file, the next operation is to clear (mark unused) the block for the operation that was just performed, in function block 2380, and pass control to branch entry 2600 in FIG. 23.

Figure 25:
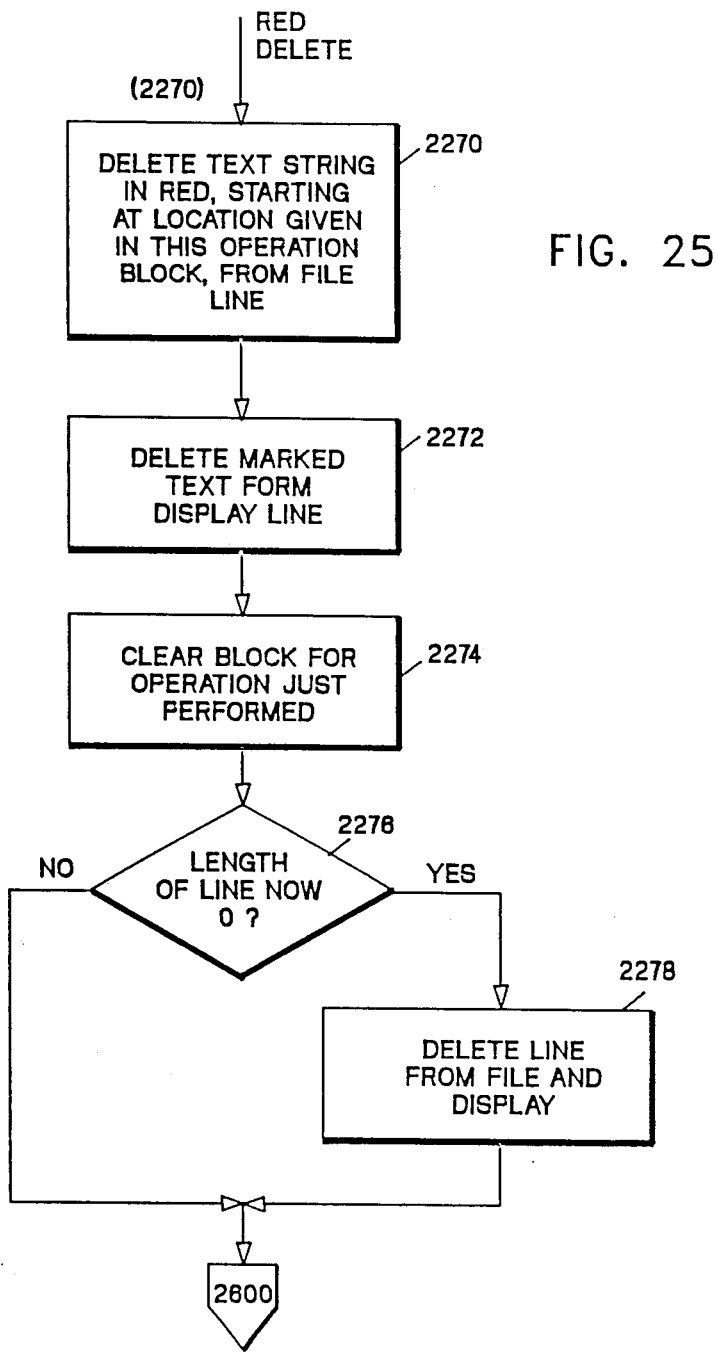
FIG. 25 is a flowchart showing the application logic associated with the execution of a predefined Delete operation.

FIG. 25 is a flowchart showing the application logic associated with the execution of a predefined Delete operation, which is activated by the color red. Control enters from FIG. 23 at function block 2270 where the text string identified in the operation block for this Delete function is removed from the file. Then the text is deleted from the display in function block 2272, and the operation block is cleared (marked unused) in function block 2274. Next, a test is performed, in decision block 2276, to determine if the length of the line is now zero, as a result of this deletion. If the length is zero the line is deleted from the file and the display. Whether the line is deleted or not, control is next passed to branch entry 2600 in FIG. 23.

Figure 26:
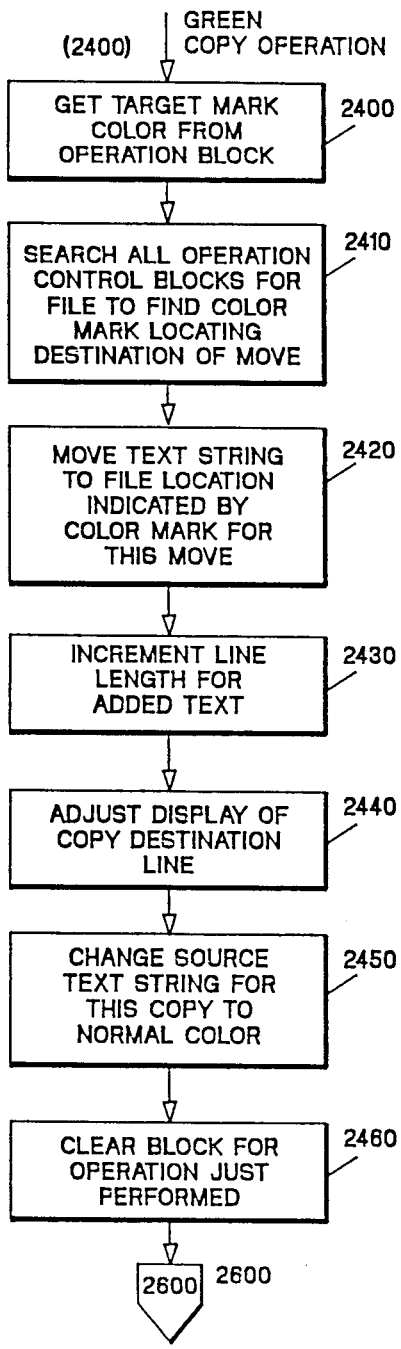
FIG. 26 is a flowchart showing the application logic associated with the execution of a Copy operation.

FIG. 26 is a flowchart showing the application logic associated with the execution of a Copy operation, which is activated by the color green. Control enters from FIG. 23 at function block 2400 where the target mark color is obtained from the operation block. Then all operation control blocks are searched, in function block 2410, to find the color mark indicating the destination of the Move operation. Next, the text is copied to the indicated destination in function block 2420, and the length of the target line is incremented to include the copied material in function block 2430. The display of the Copy destination line is adjusted for the added material in function block 2440, and the display of the source text string is changed back to normal color in function block 2450. Finally, the operation block is cleared (marked unused) in function block 2460, and control is passed to branch entry 2600 in FIG. 23.

Figure 27:
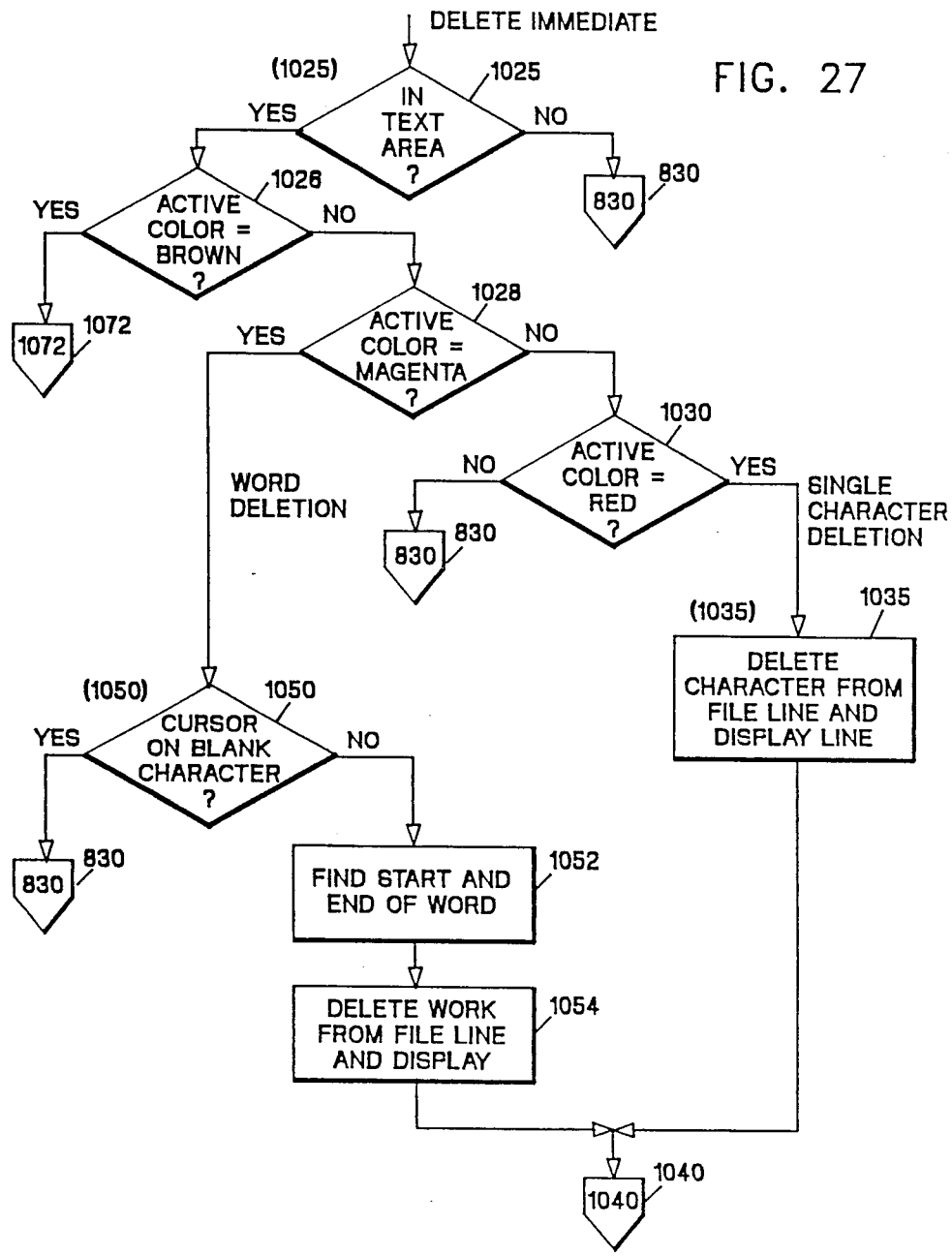
FIGS. 27 and 28 are flowcharts showing the application logic associated with the execution of an immediate Delete operation.
Figure 28:
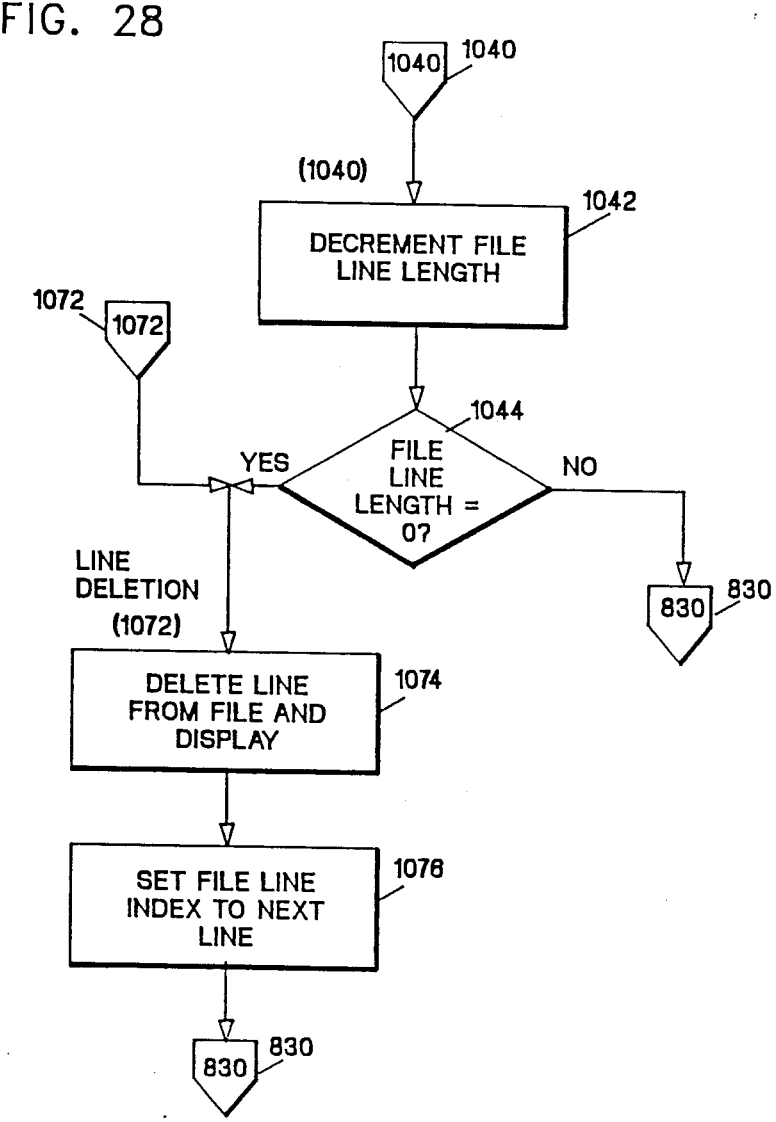

FIGS. 27 and 28 are flowcharts showing the application logic associated with the execution of an immediate Delete operation. Control enters from FIG. 3 at the decision block labeled 1025. A test is performed in this decision block to determine if the cursor is in the text area. If the cursor is not in the text area, then control is returned to branch entry 830 in FIG. 1b. If the cursor is in the text area, then the first of three tests is performed at decision block 1026 to determine the present active color. The first test is for an active color of brown. If the color is brown, then a line is to be deleted, and control is passed to branch entry 1072 in FIG. 28. If the active color is not brown, then a second test is performed in decision block 1028 to determine if the color is magenta. If the active color is magenta, then a word is to be deleted, and an additional test is performed at decision block 1050 to determine if the cursor is on a blank character. If it is on a blank character, no word is indicated, and the control is returned to branch label 830. If the cursor is not on a blank character, then the start and end of the word containing the cursor are located in function block 1052, the word is deleted in function block 1054, and control is passed to branch entry 1040 in FIG. 28.

If the color is not magenta in decision block 1028, then a test is performed in decision block 1030 to determine if the active color is red. If the color is not red, then the Delete specification is not complete, and control is returned to branch entry 830. If the active color is red, then a single character at the cursor position is deleted from the display and file at function block 1035, and control is passed to branch entry 1040 in FIG. 28.

FIG. 28 is a flowchart continuing the application logic associated with the immediate Delete operation. Control can enter from FIG. 27 either at branch entry 1040 or 1072. If the application enters at branch entry 1040, then the first operation is to decrement the file line length for the character or word just deleted, at function block 1042. Then a test is performed to determine if the file line length has become equal to zero as a result of the deletion, in decision block 1044. If the line length has not become zero, then this operation is done, and control is returned to branch entry 830. If the line length is equal to zero, then control is joined by branch label 1072 to flow into function block 1074, where the indicated line is deleted from the file and the display. Then the current file line index is set to the next line to accommodate the deleted line in function block 1076, and control is passed to branch entry 830.

Figure 29:
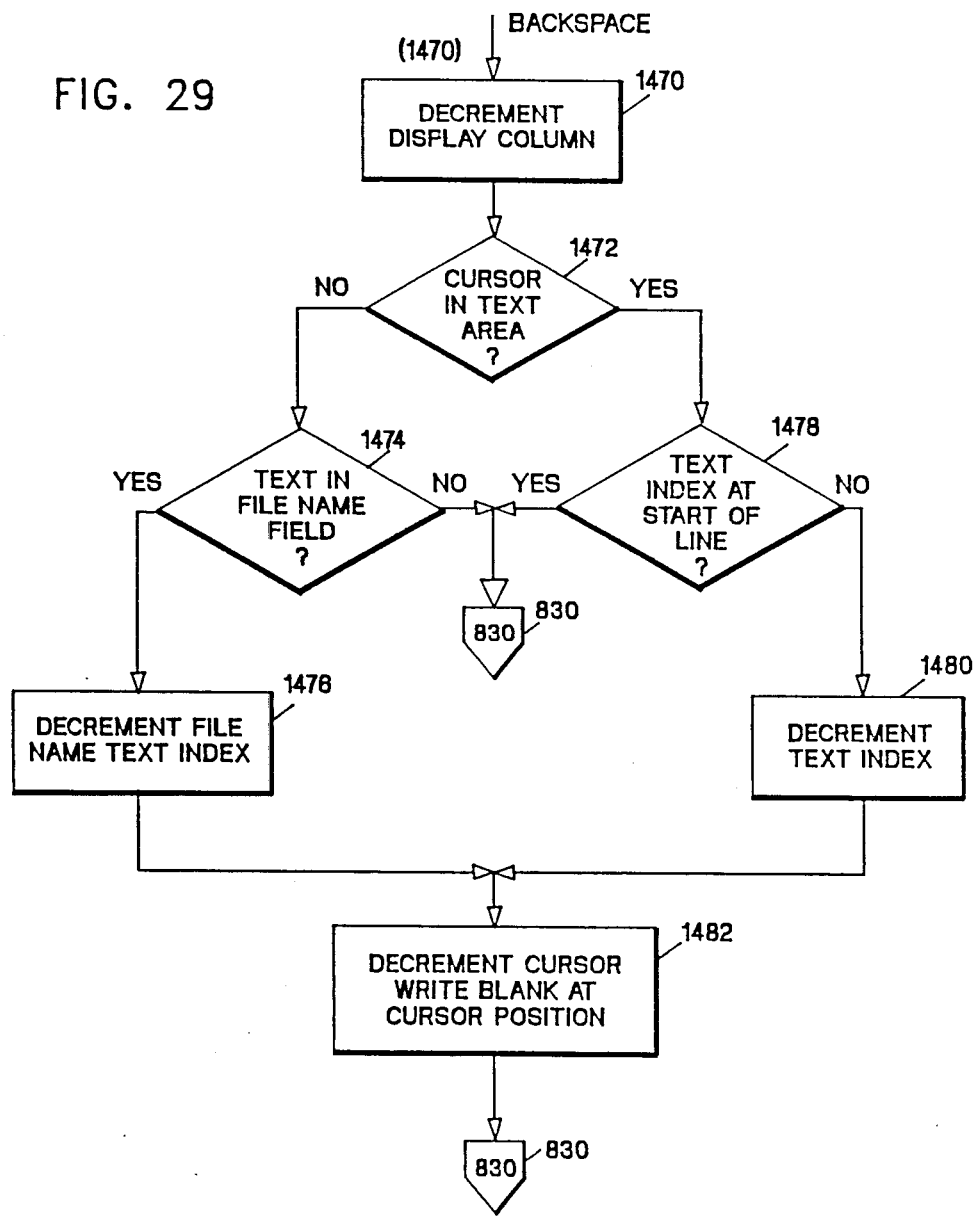
FIG. 29 is a flowchart showing the application logic associated with the backspace key operation.

FIG. 29 is a flowchart showing the application logic associated with the backspace key. Control enters from FIG. 3 at function block 1470, where the display column is decremented. A test is performed at decision block 1472 to determine if the cursor is in the text area. If the cursor is not in the text area, it is assumed to be in the file name area, and a test is performed to determine if there is text in the file name field, as indicated in decision block 1474. If there is text in the file name field, then the file name text scan index is decremented, and control flows to function block 1482, where the cursor is moved one position to the left, and the character at the new position is deleted from the file line and from the display. Control then returns to branch entry 830 in FIG. 1b. If there is no text in the file name field, then control is returned to branch entry 830.

If the cursor is in the text area in decision block 1472, a test is performed to determine if the text index is at the start of a line in decision block 1478. If the text index is not at the start of a line, then the text index is decremented in function block 1480, and control is passed to function block 1482, where the cursor is moved one position to the left, and the character at the new position is deleted from the file line and from the display. Control then returns to branch entry 830. If the text index is at the start of a line then control is passed to branch entry 830.

Figure 30:
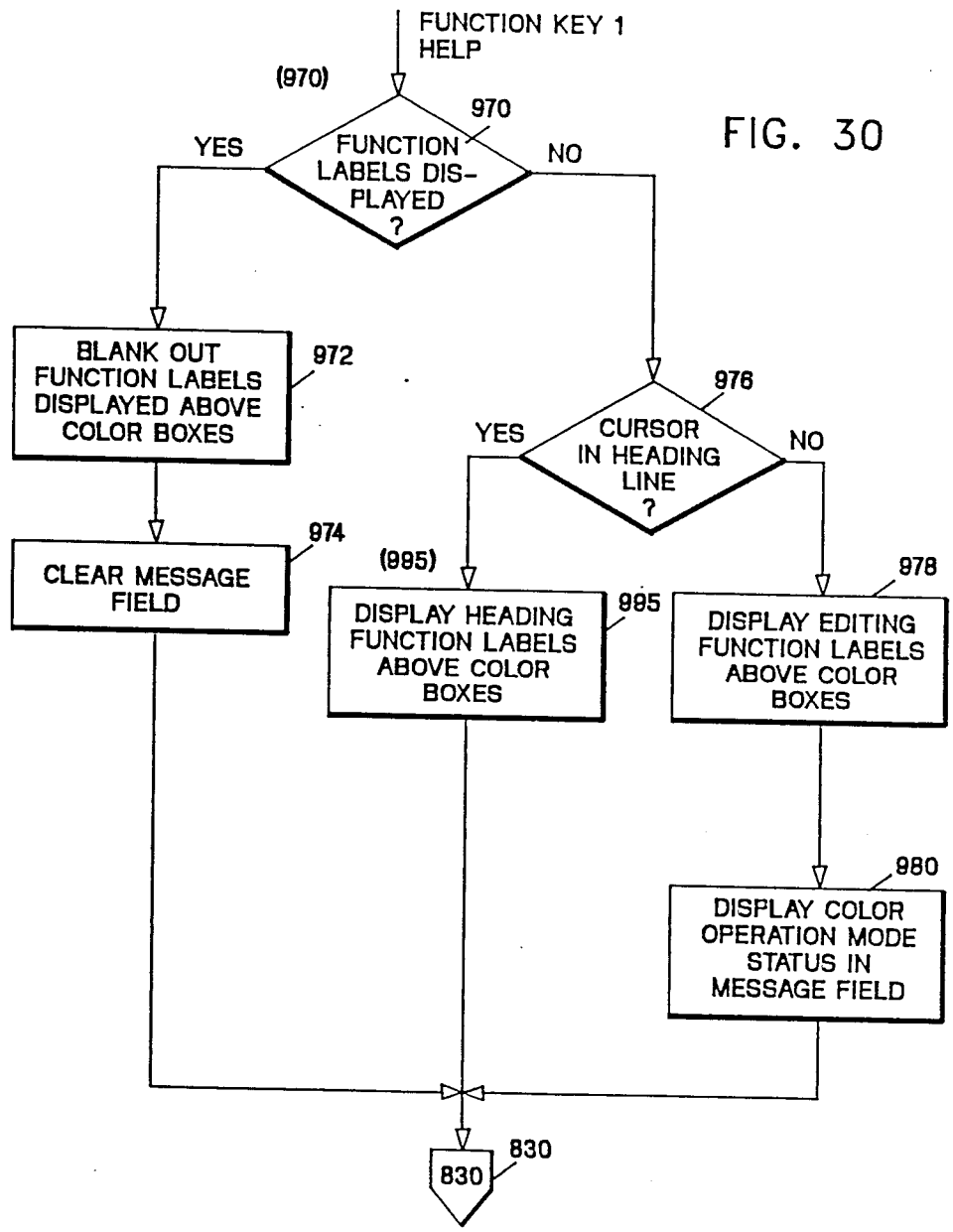
FIG. 30 is a flowchart showing the application logic associated with the help function.

FIG. 30 is a flowchart showing the application logic associated with the help function. When the help function is activated by pressing function key one, control is passed from FIG. 3 to the decision block labeled 970 where a test is performed to determine if the function labels are displayed. If the labels are displayed, then the labels are blanked out in function block 972, the message field is cleared in function block 974, and control is returned to branch entry 830. If the function labels are not currently displayed, then an additional test is performed at decision block 976 to determine if the cursor is in the heading line. If the cursor is in the heading line, then the labels for the file functions in the heading line are displayed above their respective color boxes in function block 995, and control is returned to branch entry 830. If the cursor is not in the heading line, then the labels for the editing functions are displayed above their respective color boxes in function block 978, the color operation mode status is displayed in the message field in 980, and control is returned to branch entry 830.

To further illustrate the procedure, consider a session beginning with the text shown in the top example display of FIG. 31. The user wishes to revise the text to the form shown in the bottom example display of the same FIG. (The images shown are not to scale.) The numbers down the left edge in the examples are line numbers for reference in the following description.

The following sequence of steps will accomplish this revision:

1. Starting with the cursor anywhere in the text area, position it to the "T" after "1." in line 8, using the Cursor Left, Cursor Right, Cursor Up, and Cursor Down keys as necessary.
2. Change the active color (the leftmost box in the color line) to Green, indicating a Copy operation, using F5 and F6 function keys as necessary.
3. Press F3. This turns the color mode (operation definition mode) on.
4. Change the active color to Cyan (one press of F6). This establishes a marker color needed to associate the material to be copied with the destination location.
5. Move the cursor right, using the Cursor Right key, past the phrase, "The color".
6. Press F3 again, shutting off the color mode and ending the operation definition here. The "T" of the phrase just marked above is now shown in the marker color Cyan, and the rest of the phrase is shown in the operation color Green.
7. Position the cursor, using the cursor control keys, to the space after the word "It" in line 10.
8. Change the active color to Cyan (the marker color).
9. Press F3, turning on the color mode, and then press Tab Left, establishing a destination marker for the Copy operation. Since the marker was placed at a blank character, an arrowhead has been substituted for the blank, and is now shown there in the marker color. As Tab Left was used to specify that the copied material start from the left side of the marker, the arrowhead points left.
10. Position the cursor, using the cursor control keys, to the "I" of the word "It" in line 10 (two presses of the Cursor Left key).
11. Change the active color to Red, indicating a Delete operation (one press of F6).
12. Press F3, turning on the color mode.
13. Move the cursor right, using the Cursor Right key (two presses), past the word "It".

14. Press F3 to turn the color mode off. The word "It" starting line 10 is now shown in red, indicating that it will be deleted.

15. Position the cursor just past the end of line 10 with the cursor control keys.

16. Type "or" (space, "or"). This is added to the end of the line.

17. Position the cursor to the single-letter word "a" in line 12.

18. Change the active color to Blue, indicating a Move operation (three presses of F5).

19. Press F3, turning on the color mode.

20. Change the active color to Green (one press of F6), establishing a marker color needed to associate the material to be moved with the destination location.

21. Move the cursor right, using the Cursor Right key, past the phrase, "a value to be assigned to ", to start of word "the".

22. Press F3, turning off the color mode. The word "a" starting the phrase just marked above is now shown in the marker color Green, and the rest of the phrase is displayed in the operation color Blue.

23. Position the cursor just before the word "element" in line 11.

24. Change the active color to Green (the marker color for this operation).

25. Press F3, then Tab Right. This places a marker at the position to which the phrase marked above is to be moved. The marker is again a little arrowhead, substituted for a blank, facing right this time, shown in the marker color Green.

26. Position the cursor at "t" starting the word "the" in line 10.

27. Change the active color to Blue (one press of F5).

28. Press F3, turning on the color mode.

29. Change the active color to Red (three presses of F6), establishing a marker color needed to associate the material to be moved with the destination location.

30 Move the cursor, using the Cursor Right key, past the phrase, "the data ", to start of word "or" in line 10.

31. Press F3, turning off the color mode. The initial letter, "t", of the phrase just marked above is now shown in the marker color red, and the rest of the phrase is shown in the operation color blue.

32. Position the cursor to the start of the word, "element", in line 11.

33. Change the active color to Red (the marker color for this operation).

34. Press F3, then Tab Left. This places a marker at the position to which the phrase just marked above is to be moved. The initial "e" of the word "element" is now shown in Red, indicating the position to which the phrase just marked above will be moved.

35. Position the cursor at the start of line 12. An active color of Red, for Deletion, is needed now. In this case it is already prepared, since Red was the last color used as a marker color.

36. Press F3, turning the color mode on.

37. Move the cursor, using the Cursor Right key, past the phrase, "3. It may define ", to the word "a" in line 12.

38. Press F3, turning off the color mode.

39. Position the cursor to the start of the word, "the", in line 12.

40. Press F3, turning the color mode on.

41. Move the cursor, using the Cursor Right key, to the end of the line.

42. Press F3, turning off the color mode. The two phrases in line 12 just marked in lines 37 and 41 above are now displayed in red, indicating that they are to be deleted. All of the operations necessary to revise the text shown in the top example in FIG. 31 to the form shown in the bottom example have now been defined, but none of the copies, moves, or deletions have yet been performed.

43. Press F10. The text editor will now carry out all of the specified operations, changing the text to the arrangement shown in the bottom example of FIG. 31.

Other techniques for the use of color include specifying subscripts or superscripts with a color code instead of using special sequences of control keys with the special characters associated with them.

Although a preferred embodiment of the invention has been described, one skilled in the art will recognize that this invention may be practiced with modification to meet particular applications within the spirit and scope of the appended claims.

Having thus described my invention, what I claim as new and desire to secure by Letters Patent is as follows:

1. A method for inputting data to a computer program comprising the steps of:
   associating a different color with each of a plurality of data including operations, attributes or values to be input by a user to the computer program;
   storing within a specific data field a color code corresponding to said color in a display memory and displaying the color;
   in response to the user specifying a color corresponding to the data to be input to the computer program;
   reading the color code stored in said specific data field of the display memory by said computer program; and
   processing by the computer program the read color code as input data to the computer program.

2. The method for inputting data to a computer program as recited in claim 1 wherein said color code corresponds to an operation performed by said computer program and said processing step comprises performing by the computer program said operation.

3. The method for inputting data as recited in claim 2 wherein said operation includes a delete text operation comprising the steps of:
   indicating a location on a display in a section of text;
   indicating an extent of said section of text;
   assigning a color of said delete text operation with said section of text;
   displaying said section of text in said color of said delete text operation; and
   deleting said section of text.

4. The method for inputting data as recited in claim 2 wherein said operation includes a copy text operation comprising the steps of:
   indicating a location on a display in a section of text;
   indicating an extent of said section of text;
   assigning a color of said copy text operation to said section of text;
   displaying said section of text in said color of said copy text operation;
   indicating a destination to which said section of text is to be copied;
   associating a second color with said destination and with said section of text;
   displaying said destination location in said second color; and copying said block of text to said destination.

5. The method for inputting data as recited in claim 2 wherein said operation includes a move text operation comprising the steps of:
- indicating a first location on a display in a section of text;
- indicating an extent of said section of text;
- assigning a color to indicate said move text operation for said section of text;
- displaying said section of text in said color of said operation in an original location;
- indicating a destination to which said section of text is to be moved;
- associating a second color with said destination;
- displaying said destination location in said second color;
- moving said block of text to said destination; and
- deleting said section of text in said original location.

6. The method for inputting data as recited in claim 2 wherein said operation includes a rename file operation comprising the steps of:
- entering at least one character in a file name field which identifies the file;
- assigning a color to said file name field to indicate said rename file operation;
- entering at least one character as a new file name; and
- renaming said file on a secondary storage.

7. The method for inputting data as recited in claim 2 wherein said operation includes a delete file operation comprising the steps of:
- entering at least one character in a file name field which identifies the file;
- assigning a color to said file name field to indicate said delete file operation; and
- deleting said file from a secondary storage.

8. The method for inputting data as recited in claim 2 wherein said operation includes a store file operation comprising the steps of:
- entering at least one character in a file name field which identifies the file;
- assigning a color to said file name field to indicate said store file operation; and
- storing said file on a secondary storage.

9. The method for inputting data as recited in claim 2 wherein said operation includes a get file operation comprising the steps of:
- entering at least one character in a file name field which identifies the file;
- assigning a color to said file name field to indicate said get file operation; and
- getting said file from a secondary storage.

10. The method for inputting data as recited in claim 2 wherein said operation includes a quit file operation comprising the steps of:
- entering at least one character in a file name field which identifies the file;
- assigning a color to said file name field to indicate said quit file operation; and
- quitting any operations in said file.

* * * * *